(12) United States Patent
Doi et al.

(10) Patent No.: US 6,882,394 B2
(45) Date of Patent: Apr. 19, 2005

(54) REFLECTIVE LIQUID CRYSTAL DISPLAY INCLUDING A STEP OF APPLYING CHARGED PARTICLES ON THE ORGANIC RESIN AND FILM METHOD OF MANUFACTURING

(75) Inventors: Seiji Doi, Kawasaki (JP); Yoshio Kurosawa, Kawasaki (JP)

(73) Assignee: Fujitsu-Display Technologies Corporation, Kawasaki (JP)

( * ) Notice: Subject to any disclaimer, the term of this patent is extended or adjusted under 35 U.S.C. 154(b) by 5 days.

(21) Appl. No.: 10/447,710

(22) Filed: May 29, 2003

(65) Prior Publication Data

US 2004/0001174 A1 Jan. 1, 2004

(30) Foreign Application Priority Data

May 30, 2002 (JP) ........................................ 2002-157729
Sep. 30, 2002 (JP) ........................................ 2002-287441

(51) Int. Cl.⁷ ........................... G02F 1/1335; G02F 1/13
(52) U.S. Cl. ........................................ 349/133; 349/187
(58) Field of Search .................................. 349/113, 187

(56) References Cited

U.S. PATENT DOCUMENTS

| 5,408,345 | A | * | 4/1995 | Mitsui et al. ................. 349/42 |
| 6,084,650 | A | * | 7/2000 | Sekiguchi .................... 349/106 |
| 6,366,333 | B1 | * | 4/2002 | Yamamoto et al. .......... 349/113 |
| 6,686,982 | B1 | * | 2/2004 | Yoshii ......................... 349/113 |
| 2002/0140886 | A1 | * | 10/2002 | Sugiura et al. ............. 349/113 |
| 2003/0210368 | A1 | * | 11/2003 | Yoshii et al. ............... 349/113 |
| 2004/0056997 | A1 | * | 3/2004 | Yoshii et al. ............... 349/113 |

FOREIGN PATENT DOCUMENTS

| JP | 5-347244 | 12/1993 |
| JP | 6-075238 | 3/1994 |
| JP | 2000-171792 | 6/2000 |
| JP | 2000-284302 | 10/2000 |
| JP | 2001-194677 | 7/2001 |
| JP | 2001-255529 | 9/2001 |
| JP | 2002-221716 | 8/2002 |

* cited by examiner

*Primary Examiner*—Tarifur R. Chowdhury
(74) *Attorney, Agent, or Firm*—Greer, Burns & Crain, Ltd

(57) ABSTRACT

The invention relates to a substrate for a liquid crystal display used in a display section of an information apparatus, a liquid crystal display having the same, and a method of manufacturing the same. There is provided a substrate for a liquid crystal display which achieves good display quality with reduced manufacturing steps, a liquid crystal display having the same, and a method of manufacturing the same. TFTs are formed on a glass substrate. A protective film is formed on the TFTs, and a resist pattern is formed on the protective film, the resist pattern having openings located above source electrodes, gate bus line terminals, and drain bus line terminals. The resist pattern is baked at a baking temperature of 200° or more after irradiating the surface thereof with ultraviolet light to form a wrinkled resin layer having a wrinkled surface. The protective film and an insulation film are etched using the wrinkled resin layer as an etching mask to form reflective electrodes and protective conductive films on the wrinkled resin layer.

10 Claims, 51 Drawing Sheets

FIG.45

| No. | RESIST | POST-BAKING | DOPING CONDITIONS (GAS : ACCELERATION VOLTAGE : DOSE : TIME) |
|---|---|---|---|
| 1 | RESIST A : 1.3 μm | HP : 150°C | $B_2H_6$ : 30kV : $3\times10^{15}$ : 216sec |
| 2 | RESIST A : 1.3 μm | HP : 150°C | $B_2H_6$ : 10kV : $5\times10^{13} \sim 1\times10^{14}$ : 8~20sec |
| 3 | RESIST A : 1.3 μm | HP : 150°C | $B_2H_6$ : 10kV : $2\times10^{14} \sim 1\times10^{15}$ : 38~200sec |
| 4 | RESIST A : 1.3 μm | HP : 150°C | $B_2H_6$ : 10kV : $3\times10^{13}$ : 17sec (LOW DOSE MODE) |
| 5 | RESIST A : 1.3 μm | HP : 150°C | $PH_3$ : 10kV : $1\times10^{14}$ : 13sec |
| 6 | RESIST B : 3.0 μm | HP : 150°C | $B_2H_6$ : 10kV : $5\times10^{13} \sim 5\times10^{14}$ : 8~82sec |
| 7 | RESIST B : 3.0 μm | HP : 150°C | $B_2H_6$ : 30kV : $3\times10^{14}$ : 18sec |
| 8 | RESIST B : 3.0 μm | HP : 150°C | $B_2H_6$ : 60kV : $3\times10^{14}$ : 16sec |
| 9 | RESIST B : 3.0 μm | HP : 150°C | $B_2H_6$ : 5~7.5kV : $5\times10^{13} \sim 5\times10^{14}$ : 6~78sec |
| 10 | RESIST B : 3.0 μm | CO : 140°C | $B_2H_6$ : 10kV : $1\times10^{14}$ : 20sec |
| 11 | RESIST B : 3.0 μm | CO : 150°C | $B_2H_6$ : 10kV : $1\times10^{14}$ : 20sec |
| 12 | RESIST B : 3.0 μm | CO : 160°C | $B_2H_6$ : 10kV : $1\times10^{14}$ : 20sec |
| 13 | RESIST B : 3.0 μm | CO : 170°C | $B_2H_6$ : 10kV : $1\times10^{14}$ : 20sec |

FIG.46
| No. | JUDGMENT | REFLECTIVITY |
|---|---|---|
| 1 | △ LOCALLY FORMED | - |
| 2 | ○ FINE AND DEEP | 42~49 |
| 3 | ◎ COARSE AND DEEP | 76~77 |
| 4 | X NO RECESS AND PROJECTION FORMED | - |
| 5 | ○ FINE AND DEEP | - |
| 6 | ○ FINE AND DEEP | 53~60 |
| 7 | ◎ COARSE AND DEEP | 73.3 |
| 8 | ◎ COARSE AND DEEP | 95.8 |
| 9 | ○ FINE AND DEEP | 45~47 |
| 10 | ○ FINE AND DEEP | - |
| 11 | ○ FINE AND DEEP | - |
| 12 | ○ FINE AND DEEP | - |
| 13 | X NO RECESS AND PROJECTION FORMED | - |
FIG.47A
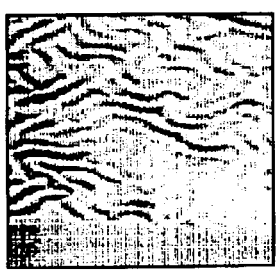
FIG.47B

No.2

No.3

No.6

No.7

No.8

No.10

No.11

No.12

REFLECTIVE LIQUID CRYSTAL DISPLAY INCLUDING A STEP OF APPLYING CHARGED PARTICLES ON THE ORGANIC RESIN AND FILM METHOD OF MANUFACTURING

BACKGROUND OF THE INVENTION

1. Field of the Invention

The present invention relates to a substrate for a liquid crystal display used for a display section of an information apparatus, a liquid crystal display having the same, and a method of manufacturing the same.

2. Description of the Related Art

Recently, liquid crystal displays belonging to classes ranging from XGA (extended graphics array having a resolution of 1024×768) to UXGA (Ultra XGA having a resolution of 1600×1200) and having diagonal dimensions in the range from 15 to 23 inches are spreading for use in desktop PCs (personal computers). This is accelerating the increase of demands for active matrix liquid crystal displays that have a switching element at each pixel. An active matrix liquid crystal display has a display characteristic higher than that of a simple matrix type liquid crystal display in that the occurrence of crosstalk is prevented by providing each pixel with a switching element that is turned off to cut off a tone signal when the pixel is not selected. In particular, a liquid crystal display utilizing thin film transistors (TFTs) as switching elements has a display characteristic equivalent to that of a CRT (cathode-ray tube) in terms of driving capability.

A general TN (twisted nematic) mode liquid crystal display has a structure in which a liquid crystal is sealed between two transparent substrates. A common electrode, color filter (CF) layers and an alignment film are formed on a surface of one of the transparent substrates opposite to the other substrate (opposite surface). TFTs, pixel electrodes and an alignment film are formed on the opposite surface of the other transparent substrate. A polarizer is applied to a surface of each transparent substrate facing oppositely to the opposite surface thereof. When the two polarizers are provided such that their polarization axes are orthogonal to each other, they enable a mode in which light is transmitted when no voltage is applied between the substrates and in which light is blocked when a voltage is applied between the substrates, i.e., a normally white mode. Conversely, when the two polarizers are provided such that their polarization axes are in parallel with each other, a normally black mode is enabled.

Recently, there are demands for liquid crystal displays having higher performance. The spread of portable telephones, portable electronic apparatus and notebook type PCs has resulted in strong demands for a reduction in power consumption, ease of outdoor use, and outdoor visibility. There are demands for development of reflective liquid crystal displays that have light-reflecting pixel electrodes and utilize external light to eliminate a need for a light source device on an assumption that they will be satisfactory in terms of the reduction of power consumption, ease of outdoor use and outdoor visibility.

A TFT substrate of a reflective liquid crystal display is formed with pixel electrodes (reflective electrodes) constituted by a metal thin film having a high reflectivity. In the reflective liquid crystal display, natural light or electrical light (light generated using electricity) that has entered from a display screen side is reflected on the TFT substrate, and the reflected light is used as a light source for liquid crystal display. The reflective electrodes have an irregular surface. The irregular surface of the reflective electrodes is provided by forming a photosensitive resin film having recesses and projections on a surface thereof under the same in advance. Light that has entered from the display screen side is irregularly reflected by the irregular surface of the reflective electrodes, which prevents any significant change in visibility even if there is a change in a position where the display screen is viewed (an angle to the display screen). This makes it possible to provide a reflective liquid crystal display having high luminance and a wide viewing angle.

JP-A-2001-194677 (herein after referred to as "Article 1") has disclosed a liquid crystal display in which an irregular resist layer is formed under reflective electrodes to form recesses and projections on a surface of the reflective electrodes that are made of aluminum (Al). The irregular resist layer is formed directly on TFTs. This results in a problem in that the TFTs can be subjected to organic contamination attributable to the resist and HMDS (hexamethyldisilazane) that is used in a process of making the substrate hydrophobic before the resist is applied. Further, since the step of forming the resist layer is a wet type process, a problem arises in that moisture and chemical scan penetrate into the TFTs. Therefore, there is a need for forming an anti-contamination protective film on the TFTs to prevent degradation of the characteristics of the TFTS, although not mentioned in Article 1.

In the liquid crystal display disclosed in Article 1, the irregular resist layer is not formed on a terminal section. Therefore, when the terminal section is constituted by an aluminum type multi-layer metal film, a problem arises in that it can be corroded when the resist layer is developed. A description will follow based on the description in Article 1 and with reference to FIGS. 49 to 64 on a substrate for a liquid crystal display and a method of manufacturing the same according to the related art in which the above-described problems are solved.

FIG. 49 shows a configuration of a TFT substrate of a reflective liquid crystal display according to the related art. FIG. 50A shows a section of the TFT substrate taken along the line X—X in FIG. 49, and FIG. 50B shows a section of the TFT substrate taken along the line Y—Y in FIG. 49. FIG. 50C shows a section of the TFT substrate taken along the line Z—Z in FIG. 49. As shown in FIG. 49 and FIGS. 50A to 50C, the TFT substrate has a plurality of gate bus lines 112 formed on a glass substrate 110 such that they extend in the horizontal direction in FIG. 49 in parallel with each other. A plurality of drain bus lines 114 are formed such that they extend in the vertical direction in FIG. 49 in parallel with each other and such that they intersect the gate bus lines 112 with an insulation film (gate insulation film) 122 formed on the gate bus lines 112 interposed therebetween.

TFTs 120 are formed in the vicinity of positions where the gate bus lines 112 and the drain bus lines 114 intersect. An active semiconductor layer 124 made of amorphous silicon (a-Si), a channel protection film 125 and an n-type impurity semiconductor layer 126 made of n⁺a-Si are formed in the order listed on the gate electrode (gate bus line) 112 of a TFT 120 with the insulation film 122 interposed. A drain electrode 128 that is extended from the drain bus line 114 and a source electrode 130 are formed on the n-type impurity semiconductor layer 126. Electrical isolation is achieved between the drain electrode 128 and the n-type impurity semiconductor layer 126 under the same and between the source electrode 130 and the n-type impurity semiconductor layer 126 under the same. A protective film 136 is formed on the drain electrode 128 and the source electrode 130. A resist layer 152 having an irregular surface is formed on the protective film 136.

Reflective electrodes 116 made of a light-reflecting material such as Al are formed in pixel regions that are provided in the form of a matrix on the TFT substrate. The reflective electrodes 116 are formed with an irregular configuration that follows the surface configuration of the resist layer 152. The reflective electrodes 116 are electrically connected to the source electrodes 130 through contact holes 138. A storage capacitor bus line 118 is formed such that it extends across each pixel region substantially in parallel with the gate bus lines 112. A storage capacitor electrode (intermediate electrode) 132 is formed in each pixel region above the storage capacitor bus line 118 with the insulation film 122 interposed therebetween. The reflective electrodes 116 are electrically connected to the storage capacitor electrodes 132 through contact holes 139.

Gate bus line terminals 140 are formed at one end (on the left side of FIG. 49) of the gate bus lines 112. Protective conductive films 141 made of the same material as that of the reflective electrodes 116 are formed on the gate bus line terminals 140. The protective conductive films 141 are electrically connected to the gate bus line terminals 140 through contact holes 142. Drain bus line terminals 144 are formed at one end (at the top of FIG. 49) of the drain bus lines 114. Protective conductive films 145 made of the same material as that of the reflective electrodes 116 are formed on the drain bus line terminals 144. The protective conductive films 145 are electrically connected to the drain bus line terminals 144 through contact holes 146. Storage capacitor bus line terminals 148 are formed at one end (on the left side of FIG. 49) of the storage capacitor bus lines 118. Protective conductive films 149 made of the same material as that of the reflective electrodes 116 are formed on the storage capacitor bus line terminals 148. The protective conductive films 149 are electrically connected to the storage capacitor bus line terminals 148 through contact holes 150.

A method of manufacturing a TFT substrate for a reflective liquid crystal display according to the related art will now be described with reference to FIGS. 51 to 64. FIGS. 51, 52, 54, 55, 57, 58, 60, 61A, 63 and 64 are sectional views taken in a process showing steps of manufacturing a TFT substrate according to the related art and showing a section corresponding to that in FIG. 50A. FIG. 61B is a sectional view taken in a process showing a step of manufacturing the TFT substrate according to the related art and showing a section corresponding to that in FIG. 50B. FIG. 61C is a sectional view taken in a process showing a step of manufacturing the TFT substrate according to the related art and showing a section corresponding to that in FIG. 50C. FIGS. 53, 56, 59 and 62 show steps of manufacturing the TFT substrate according to the related art, and they are views of the TFT substrate taken in a direction perpendicular to a surface of the substrate.

As shown in FIG. 51, a metal film 160 is formed throughout a top surface of a glass substrate 110. A resist is applied on the metal film 160 throughout the substrate and is patterned using a first photo-mask to form a resist pattern 161. Next, as shown in FIGS. 52 and 53, etching is performed using the resist pattern 161 as an etching mask to form gate bus lines 112, storage capacitor bus lines 118, gate bus line terminals 140 and storage capacitor bus line terminals 148. The resist pattern 161 is then removed.

Next, as shown in FIG. 54, an insulation film 122, an a-Si layer 124' and a silicon nitride film (SiN film) 125' are formed in the order listed throughout the substrate. Next, a positive resist is applied throughout the substrate. Next, back surface exposure is performed at the bottom (at the bottom of FIG. 54) of the glass substrate 110 using the gate bus lines 112 as a mask, and exposure is further performed using a second photo-mask to form a resist pattern 162 on the gate bus lines 112 on a self-alignment basis. Next, as shown in FIGS. 55 and 56, etching is performed using the resist pattern 162 as an etching mask to form channel protection films 125. The resist pattern 162 is then removed.

Next, an $n^+$a-Si layer 126' and a metal film 128' are continuously formed as shown in FIG. 57. A resist is then applied on the metal film 128' throughout the substrate and patterned using a third photo-mask to form a resist pattern 163. Next, as shown in FIGS. 58 and 59, etching is performed using the resist pattern 163 as an etching mask to form each of an active semiconductor layer 124, drain bus lines 114, drain electrodes 128, source electrodes 130, drain bus line terminals 144 and storage capacitor electrodes 132. Thus, TFTs 120 are formed. The resist pattern 163 is then removed.

Next, as shown in FIG. 60, a protective film 136 constituted by a transparent insulation film is formed throughout the substrate. A resist is then applied on the protective film 136 throughout the substrate and patterned using a fourth photo-mask to form a resist pattern 164. Next, as shown in FIGS. 61A to 61C and FIG. 62, etching is performed using the resist pattern 164 as an etching mask to form each of contact holes 138', 139', 142', 146' and 150'. The resist pattern 164 is then removed.

A positive resist is then applied throughout the substrate. Next, in order to form recesses and projections on the surface, exposure is performed with ultraviolet (UV) light of low illumination using a fifth photo-mask having a plurality of circular light shield sections. Next, exposure is performed with UV light of high illumination using a sixth photo-mask having openings in positions associated with the contact holes 138', 139', 142', 146' and 150'. When developing is subsequently performed, as shown in FIG. 63, openings are formed in the regions above the contact holes 138', 139', 142', 146' and 150' that have been exposed to the UV light of high illumination to form contact holes 138, 139, 142, 146 and 150. On the contrary, in the regions exposed to the UV light of low illumination, the thickness of the resist layer becomes smaller than that in the regions shielded from light with the light shield sections by a predetermined amount. This provides an irregular resist layer 152 that is formed with recesses and projections on a surface thereof.

Next, as shown in FIG. 64, a metal film 116' made of Al is formed on the irregular resist layer 152 throughout the substrate. Patterning is then performed using a seventh photo-mask to form a reflective electrode 116 in each pixel region, protective conductive films 141 on the gate bus line terminals 140, protective conductive films 149 on the storage capacitor bus line terminals 148 and protective conductive films 145 on the drain bus line terminals 144. The above-described steps complete a TFT substrate as shown in FIG. 49 and FIGS. 50A to 50C.

According to the above method of manufacturing a TFT substrate, the protective film 136 constituted by a SiN film is formed on the TFTs 120 after device isolation, and contact holes 138', 139', 142', 146' and 150' are formed in the protective film 136 and the insulation film 122 in advance before the irregular resist layer 152 is formed. According to the above method of manufacturing a TFT substrate, the recesses and projections on the surface of the irregular resist layer 152 are formed using the fifth photo-mask, and the contact holes 138, 139, 142, 146 and 150 are formed using the separate sixth photo-mask. Thus, seven photo-masks are required at the steps for manufacturing a reflective TFT substrate. Therefore, the TFT substrate is manufactured through a greater number of steps compared to those for a transmissive TFT substrate that is normally manufactured using five photo-masks, which problematically results in an increase in the manufacturing cost and a reduction in yield of manufacture.

SUMMARY OF THE INVENTION

It is an object of the invention to provide a substrate for a liquid crystal display that provides good display quality with reduced manufacturing steps, a liquid crystal display having the same, and a method of manufacturing the same.

The above-described object is achieved by a substrate for a liquid crystal display, characterized in that it has: pixel regions arranged in the form of a matrix on a base substrate; a plurality of first bus lines formed on the base substrate in parallel with each other; a first insulation film formed on the first bus lines; a plurality of second bus lines formed in parallel with each other such that they intersect the first bus lines with the first insulation film interposed therebetween; a thin film transistor formed at each of the pixel regions; a second insulation film formed on the thin film transistor; a wrinkled resin layer on the second insulation film, the wrinkled resin layer being formed with wrinkles on a surface thereof and having an insulating property; a reflective electrode formed of a light-reflecting material at each of the pixel regions on the wrinkled resin layer, a surface of the reflective electrode being formed with wrinkles that follow the surface of the wrinkled resin layer; a plurality of bus line terminals connected to each of the first and second bus lines; and a plurality of protective conductive films that are formed on the plurality of bus line terminals respectively from the same material as that of the reflective electrode and that are connected to the plurality of bus line terminals respectively.

BRIEF DESCRIPTION OF THE DRAWINGS

FIG. 45 is a (first) table showing results of an examination on states of formation of wrinkle-like recesses and projections conducted with the gas species, acceleration voltage, dose and doping time varied;

FIG. 46 is a (second) table showing results of an examination on states of formation of wrinkle-like recesses and projections conducted with the gas species, acceleration voltage, dose and doping time varied;

FIGS. 47A to 47B are optical microscopic images showing an example of wrinkle-like recesses and projections formed on a surface of a resist film, and FIG. 47B is an electronic microscopic image of a section of the resist film;

DESCRIPTION OF THE PREFERRED EMBODIMENTS

[First Mode for Carrying out the Invention]

(Embodiment 1—1)

Figure 1:
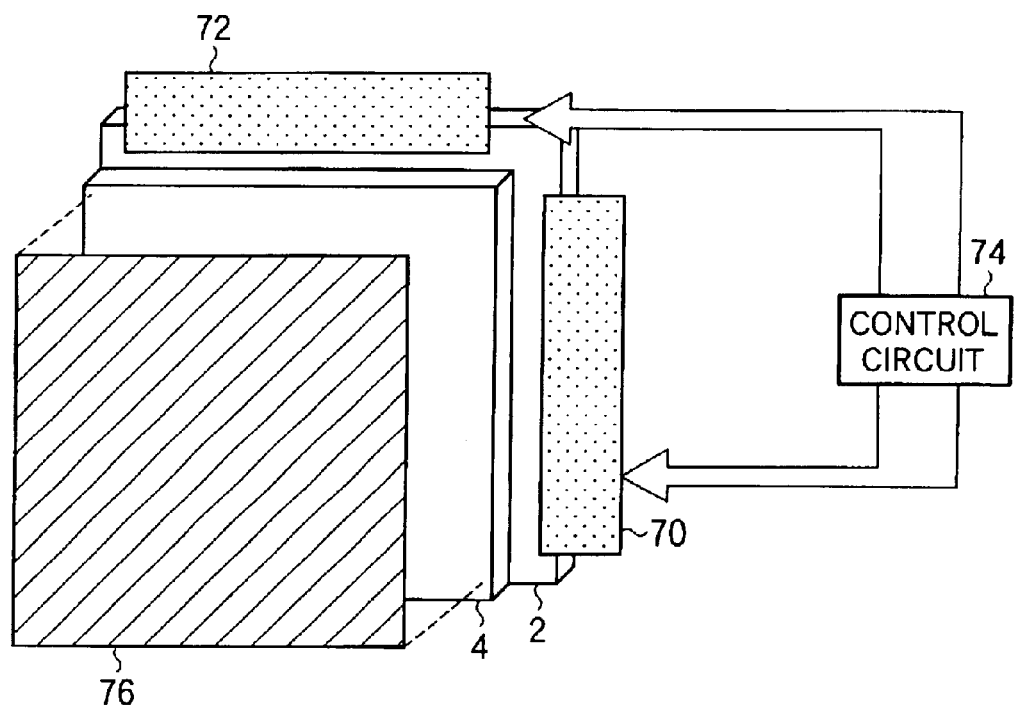
FIG. 1 shows a schematic configuration of a liquid crystal display according to Embodiment 1—1 in a first mode for carrying out the invention.

A description will now be made with reference to FIGS. 1 to 18 on a substrate for a liquid crystal display, a liquid crystal display having the same, and a method of manufacturing the same according to Embodiment 1—1 in a first mode for carrying out the invention. FIG. 1 shows a schematic configuration of a liquid crystal display according to the present embodiment. As shown in FIG. 1, a reflective liquid crystal display has a structure in which a TFT substrate (base substrate) 2 having a TFT and a reflective electrode formed at each pixel region and a CF substrate 4 having CF (color filter) layers formed thereon are combined in a face-to-face relationship and in which a liquid crystal is sealed between the substrates 2 and 4.

The TFT substrate 2 is formed with a plurality of gate bus lines and a plurality of drain bus lines that intersect each other with an insulation film interposed therebetween. There is provided a gate bus line driving circuit 70 loaded with driver ICs for driving the plurality of gate bus lines and a drain bus line driving circuit 72 loaded with driver ICs for driving the plurality of drain bus lines. The driving circuits 70 and 72 output scan signals and data signals to predetermined gate bus lines or drain bus lines based on predetermined signals output by a control circuit 74. A polarizer 76 is applied to a surface of the CF substrate 4 facing oppositely to a surface thereof on which color filters are formed.

Figure 2:
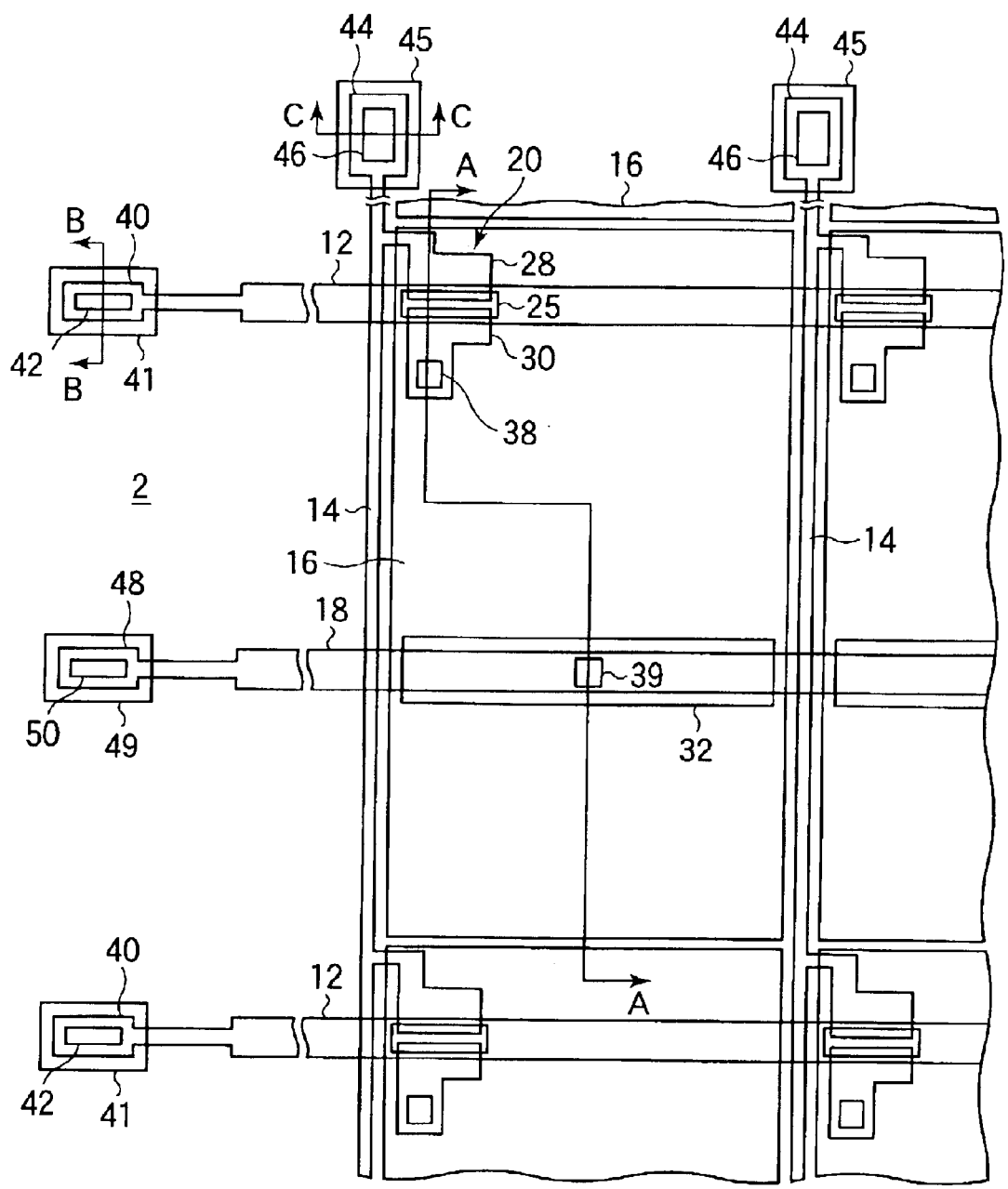
FIG. 2 shows a configuration of a substrate for a liquid crystal display according to Embodiment 1—1 in the first mode for carrying out the invention.
Figure 3A:
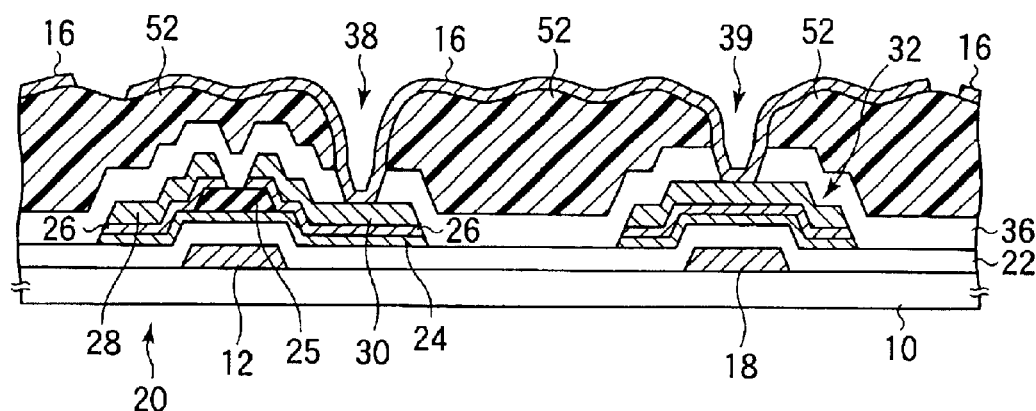
FIGS. 3A to 3C are sectional views showing the configuration of the substrate for a liquid crystal display according to Embodiment 1—1 in the first mode for carrying out the invention.
Figure 3B:
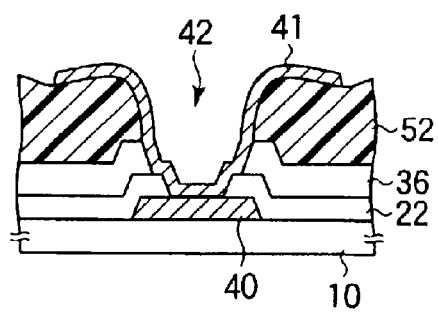
Figure 3C:
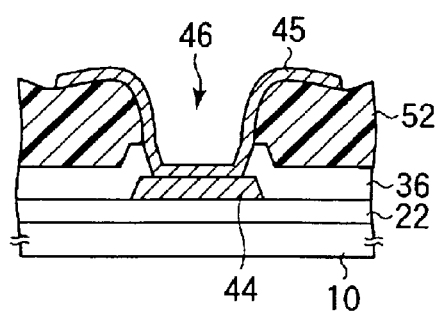

FIG. 2 shows a configuration of the substrate for a liquid crystal display according to the present embodiment. FIG. 3A shows a section of the substrate for a liquid crystal display taken along the line A—A in FIG. 2. FIG. 3B shows a section of the substrate for a liquid crystal display taken along the line B—B in FIG. 2. FIG. 3C shows a section of the substrate for a liquid crystal display taken along the line C—C in FIG. 2. As shown in FIG. 2 and FIGS. 3A to 3C, the TFT substrate 2 has a plurality of gate bus lines 12 formed on a transparent glass substrate 10 such that they extend in the horizontal direction in FIG. 2 in parallel with each other (FIG. 2 shows two of the gate bus lines 12). An insulation film (gate insulation film) 22 constituted by a SiN film or silicon oxide film (SiO film) is formed on the gate bus lines 12. A plurality of drain bus lines 14 extending in the vertical direction in FIG. 2 in parallel with each other are formed such that they intersect the gate bus lines 12 with the insulation film 22 interposed therebetween (FIG. 2 shows two of the drain bus lines 14).

TFTs 20 are formed in the vicinity of positions where the gate bus lines 12 and the drain bus lines 14 intersect. An active semiconductor layer 24 made of, for example, amorphous silicon (a-Si), a channel protection film 25 constituted by, for example, a SiN film and an n-type impurity semiconductor layer (ohmic contact layer) 26 made of, for example, n$^+$a-Si are formed in the order listed on the gate electrode (gate bus line) 12 of a TFT 20 with the insulation film 22 interposed therebetween. A drain electrode 28 that is extended from the drain bus line 14 and a source electrode 30 are formed on the n-type impurity semiconductor layer 26. Electrical isolation is achieved between the drain electrode 28 and the n-type impurity semiconductor layer 26 under the same and between the source electrode 30 and the n-type impurity semiconductor layer 26 under the same. A protective film 36 that is constituted by, for example, a SiN film and that has an insulating property is formed on the drain electrode 28 and the source electrode 30. A wrinkled resin layer (resist layer) 52 having a wrinkled surface is formed on the protective film 36. The wrinkled resin layer 52 is constituted by a single resist layer having photosensitive and insulating properties, for example.

Reflective electrodes 16 made of a light-reflecting material such as Al are formed in pixel regions that are provided in the form of a matrix on the TFT substrate 2. The reflective electrodes 16 are formed with wrinkles that follow the surface configuration of the wrinkled resin layer 52. The reflective electrodes 16 are electrically connected to the source electrodes 30 through contact holes 38. A storage capacitor bus line 18 is formed such that it extends across each pixel region substantially in parallel with the gate bus lines 12. A storage capacitor electrode (intermediate electrode) 32 is formed at each pixel region above the storage capacitor bus line 18 with the insulation film 22 interposed therebetween. The reflective electrodes 16 are electrically connected to the storage capacitor electrodes 32 through contact holes 39.

Gate bus line terminals 40 are formed at one end (on the left side of FIG. 2) of the gate bus lines 12. Protective conductive films 41 made of the same material as that of the reflective electrodes 16 are formed on the gate bus line terminals 40. The protective conductive films 41 are electrically connected to the gate bus line terminals 40 through contact holes 42 that are openings in the protective film 36 and the insulation film 22. Drain bus line terminals 44 are formed at one end (at the top of FIG. 2) of the drain bus lines 14. Protective conductive films 45 made of the same material as that of the reflective electrodes 16 are formed on the drain bus line terminals 44. The protective conductive films 45 are electrically connected to the drain bus line terminals 44 through contact holes 46 that are openings in the protective film 36. Storage capacitor bus line terminals 48 are formed at one end (on the left side of FIG. 2) of the storage capacitor bus lines 18. Protective conductive films 49 made of the same material as that of the reflective electrodes 16 are formed on the storage capacitor bus line terminals 48. The protective conductive films 49 are electrically connected to the storage capacitor bus line terminals 48 through contact holes 50 that are openings in the protective film 36 and the insulation film 22. A wrinkled resin layer 52 is formed at the periphery of the gate bus line terminals 40 and the drain bus line terminals 44. A wrinkled resin layer 52 is formed at the periphery of the gate bus line terminals 48.

A method of manufacturing a substrate for a liquid crystal display and a liquid crystal display having the same according to the present embodiment will now be described with reference to FIGS. 4 to 18. FIGS. 4, 5, 7, 8, 10, 11, 13, 14, 15A, 17 and 18 are sectional views taken in processes showing steps of manufacturing a substrate for a liquid crystal display according to the present embodiment and showing a section corresponding to that in FIG. 3A. FIG. 15B is a sectional view taken in a process showing a step of manufacturing the substrate for a liquid crystal display according to the present embodiment and showing a section corresponding to that in FIG. 3B. FIG. 15C is a sectional view taken in a process showing a step of manufacturing the substrate for a liquid crystal display according to the present embodiment and showing a section corresponding to that in FIG. 3C. FIGS. 6, 9, 12 and 16 show steps of manufacturing the substrate for a liquid crystal display according to the present embodiment, and they are views of the TFT substrate taken in a direction perpendicular to a surface of the substrate.

Figure 4:
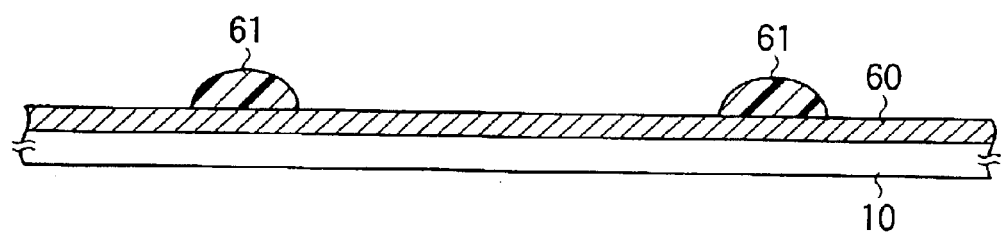
FIG. 4 is a sectional view taken in a process showing a method of manufacturing the substrate for a liquid crystal display according to Embodiment 1—1 in the first mode for carrying out the invention.

As shown in FIG. 4, a metal film (gate metal layer) 60 is formed throughout a top surface of a glass substrate 10 by forming an Al film having a thickness of, for example, 100 nm and a titanium (Ti) film having a thickness of, for example, 50 nm in the order listed on the substrate using a PVD (physical vapor deposition) process, for example. The metal film 60 may be constituted by a chromium (Cr) film, Al alloy film or molybdenum (Mo) film. A resist (photosensitive resin) is applied on the metal film 60 throughout the substrate and is patterned using a first photo-mask to form a resist pattern 61 having a predetermined configuration.

Figure 5:
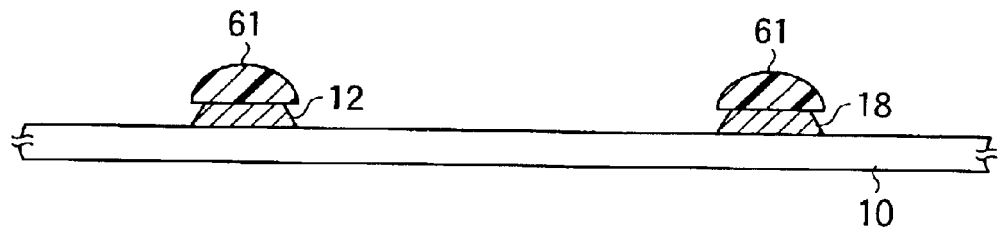
FIG. 5 is a sectional view taken in a process showing the method of manufacturing the substrate for a liquid crystal display according to Embodiment 1—1 in the first mode for carrying out the invention.
Figure 6:
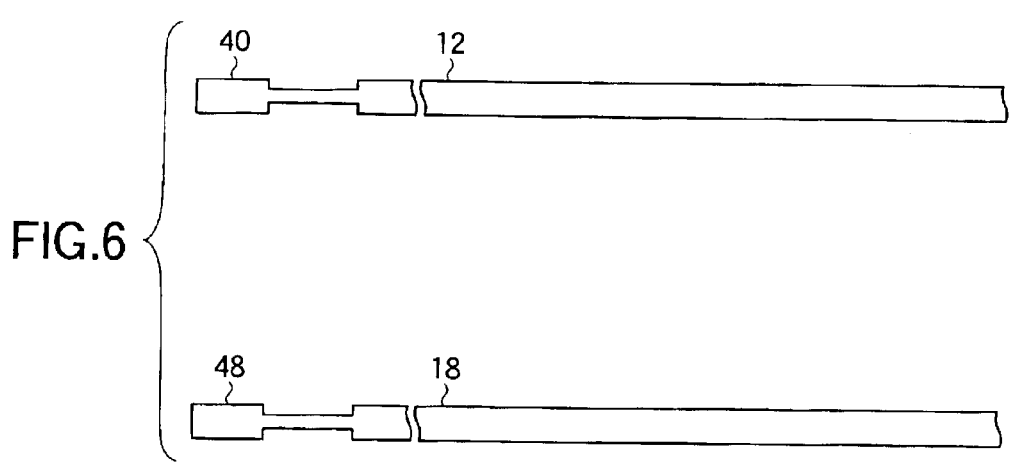
FIG. 6 shows the method of manufacturing the substrate for a liquid crystal display according to Embodiment 1—1 in the first mode for carrying out the invention.

Next, as shown in FIGS. 5 and 6, dry etching is performed with a chlorine type gas using the resist pattern 61 as an etching mask. When the metal film 60 is constituted by a Cr film, wet etching is performed using a Cr etchant. When the metal film 60 is constituted by an Al alloy film or Mo type film, wet etching is performed using an Al etchant. Thus, gate bus lines 12, storage capacitor bus lines 18, gate bus line terminals 40 and storage capacitor bus line terminals 48 are formed. The resist pattern 61 is then removed.

Figure 7:
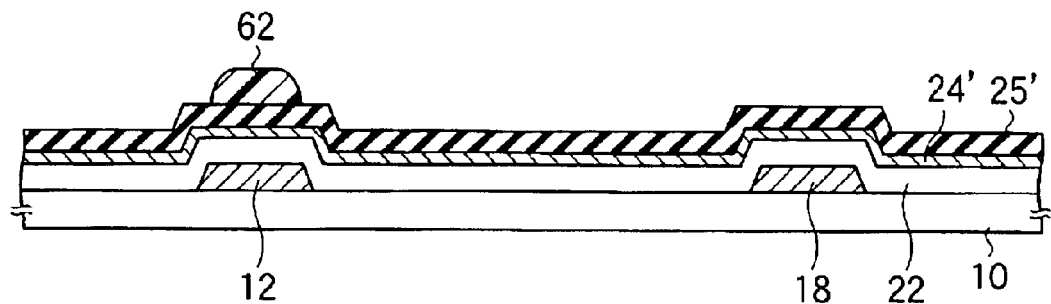
FIG. 7 is a sectional view taken in a process showing the method of manufacturing the substrate for a liquid crystal display according to Embodiment 1—1 in the first mode for carrying out the invention.

Next, as shown in FIG. 7, an insulation film 22 constituted by a SiN film that is transparent and that has an insulating property and a thickness of, for example, 350 nm, an a-Si layer 24' having a thickness of, for example, 30 nm and a SiN film 25' having a thickness of, for example, 120 nm are continuously formed in the order listed throughout the substrate using a plasma CVD (chemical vapor deposition) process, for example. Next, a positive resist that is solubilized in a photosensitive part thereof is applied throughout the substrate. Next, back surface exposure is performed at the bottom (the bottom of FIG. 7) of the glass substrate 10 using the gate bus lines 12 as a mask, and exposure is further performed using a second photo-mask to form a resist pattern 62 on the gate bus lines 12 on a self-alignment basis.

Figure 8:
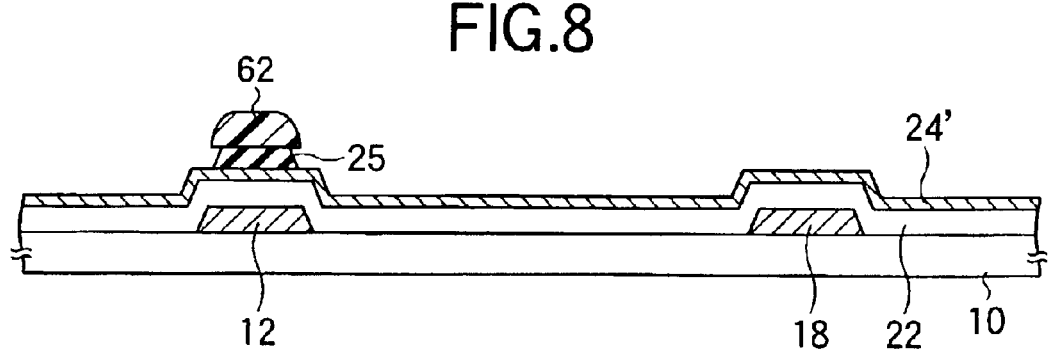
FIG. 8 is a sectional view taken in a process showing the method of manufacturing the substrate for a liquid crystal display according to Embodiment 1—1 in the first mode for carrying out the invention.
Figure 9:
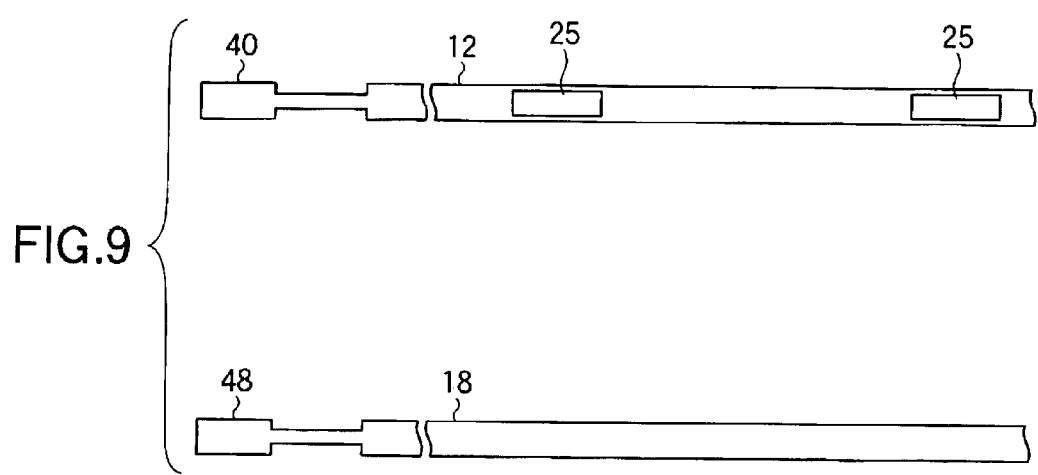
FIG. 9 shows the method of manufacturing the substrate for a liquid crystal display according to Embodiment 1—1 in the first mode for carrying out the invention.

Next, as shown in FIGS. 8 and 9, etching is performed using the resist pattern 62 as an etching mask to form channel protection films 25 in regions on the gate bus lines 12 where TFTs 20 are to be formed. The resist pattern 62 is then removed.

Figure 10:
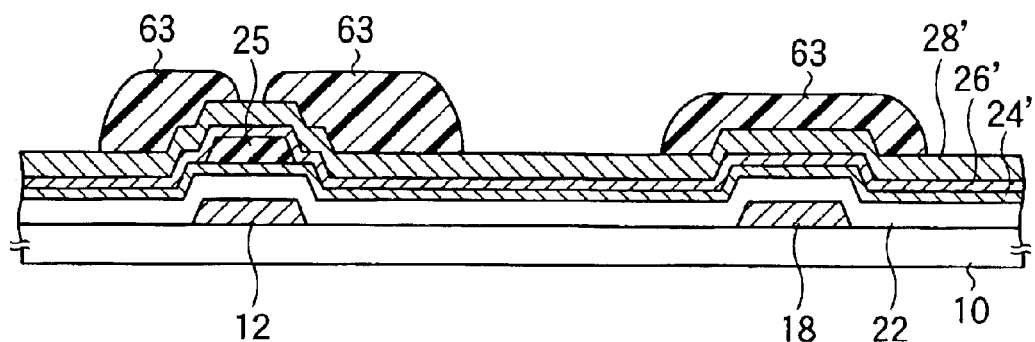
FIG. 10 is a sectional view taken in a process showing the method of manufacturing the substrate for a liquid crystal display according to Embodiment 1—1 in the first mode for carrying out the invention.

Next, as shown in FIG. 10, an n$^+$a-Si layer 26' having a thickness of, for example, 30 nm and a metal film (drain metal layer) 28' comprised of, for example, a Ti film having a thickness of 20 nm, an Al film having a thickness of 75 nm and a Ti film having a thickness of 20 nm are continuously formed in the order listed using a PVD process, for example. The metal film 28' may be constituted by an Al alloy film or a multi-layer film of other low-resistance metals. A resist is then applied on the metal film 28' throughout the substrate and patterned using a third photo-mask to form a resist pattern 63 having a predetermined configuration.

Figure 11:
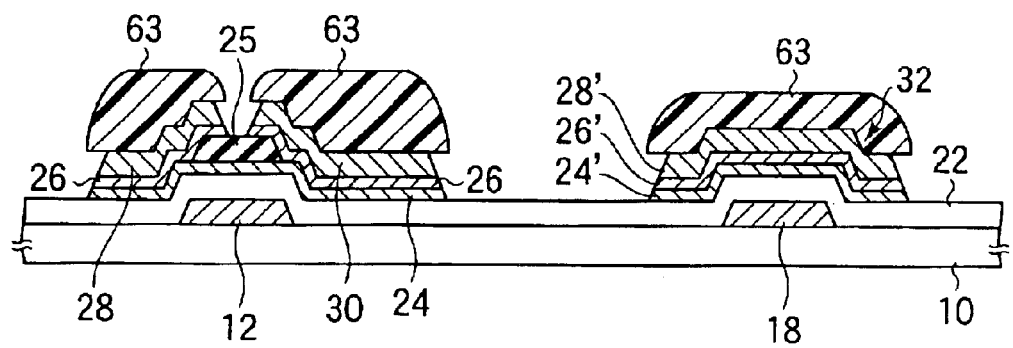
FIG. 11 is a sectional view taken in a process showing the method of manufacturing the substrate for a liquid crystal display according to Embodiment 1—1 in the first mode for carrying out the invention.
Figure 12:
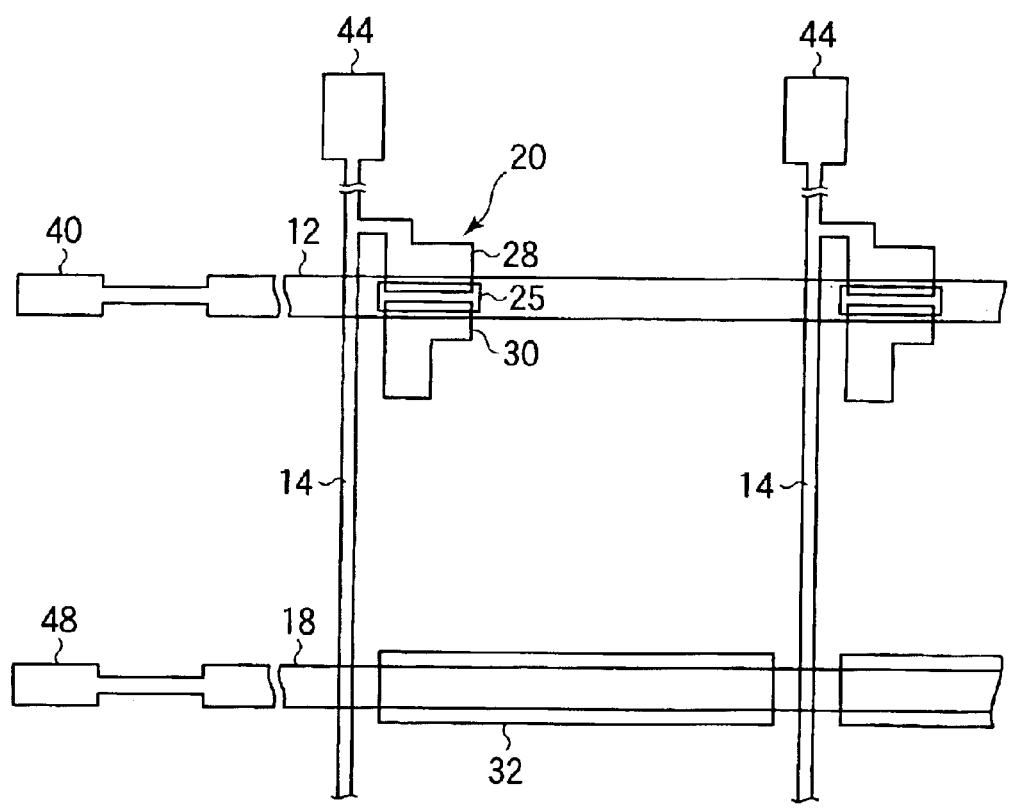
FIG. 12 shows the method of manufacturing the substrate for a liquid crystal display according to Embodiment 1—1 in the first mode for carrying out the invention.

Next, as shown in FIGS. 11 and 12, the resist pattern 63 is used as an etching mask to perform dry etching of the metal film 28', the n$^+$a-Si layer 26' and the a-Si layer 24' at a time. The etching is performed using an RIE (reactive ion etching) process utilizing a chlorine type gas. The channel protection films 25 function as an etching stopper during the etching, and the a-Si layer 24' under the same remains without being etched. Thus, each of an active semiconductor layer 24, drain bus lines 14, drain electrodes 28, source electrodes 30, drain bus line terminals 44 and storage capacitor electrodes 32 is formed. The resist pattern 63 is then removed.

Figure 13:
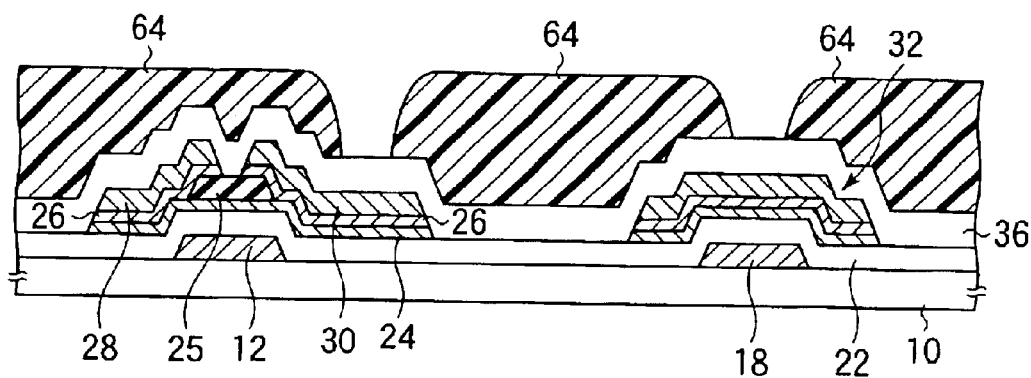
FIG. 13 is a sectional view taken in a process showing the method of manufacturing the substrate for a liquid crystal display according to Embodiment 1—1 in the first mode for carrying out the invention.
Figure 14:
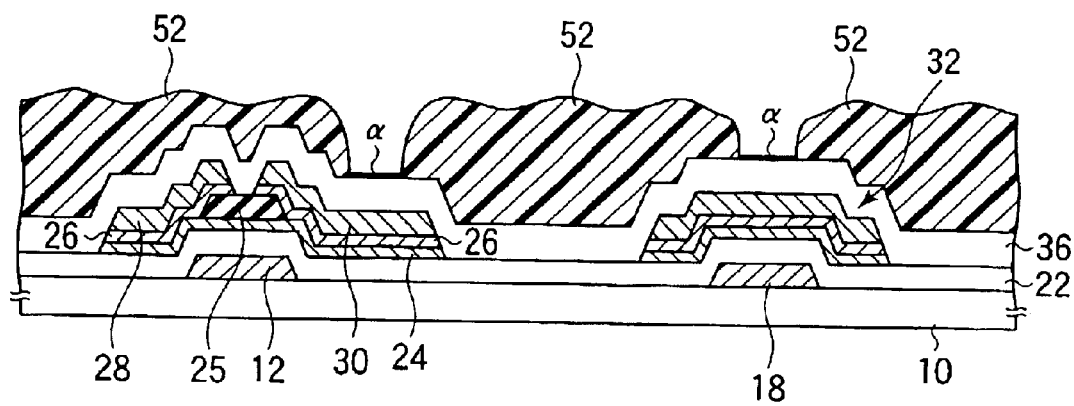
FIG. 14 is a sectional view taken in a process showing the method of manufacturing the substrate for a liquid crystal display according to Embodiment 1—1 in the first mode for carrying out the invention.

Next, as shown in FIG. 13, a protective film 36 that has transparency and an insulating property and that is constituted by a SiN film having a thickness of, for example, 330 nm is formed throughout the substrate using a plasma CVD process, for example. A positive resist having a thickness of, for example, about 3.5 µm is then applied on the protective film 36 throughout the substrate and patterned using a fourth photo-mask to form a resist pattern 64 having a predetermined configuration.

Next, after irradiating the surface of the resist pattern 64 with UV light, the resist pattern 64 is baked at a baking temperature of 200° C., for example. The UV light is preferably radiated at a radiation wavelength equal to or less than that of an i-ray (the wavelength being specifically in the range from 170 to 260 nm) and with a radiation energy of about 30 mJ. As a result, a crosslinking reaction occurs only on the surface of the resist pattern 64 to form wrinkle-like recesses and projections, and a wrinkled resin layer 52 is thus provided, as shown FIG. 14. At this time, a sublimate of the resist is formed in regions a when the resist is baked.

Figure 15A:
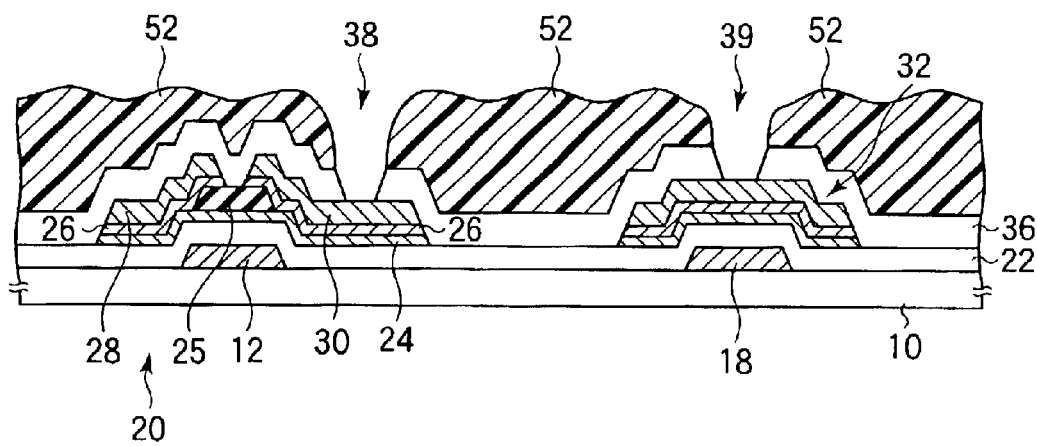
FIGS. 15A to 15C are sectional views taken in a process showing the method of manufacturing the substrate for a liquid crystal display according to Embodiment 1—1 in the first mode for carrying out the invention.
Figure 15B:
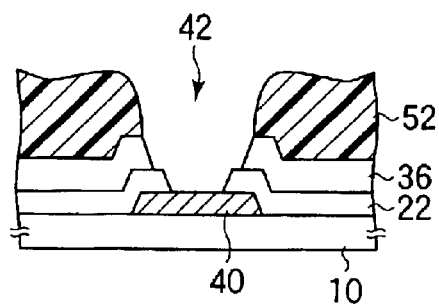
Figure 15C:
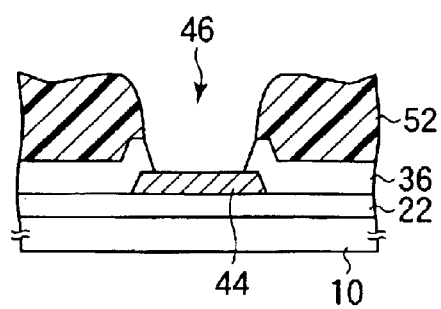
Figure 16:
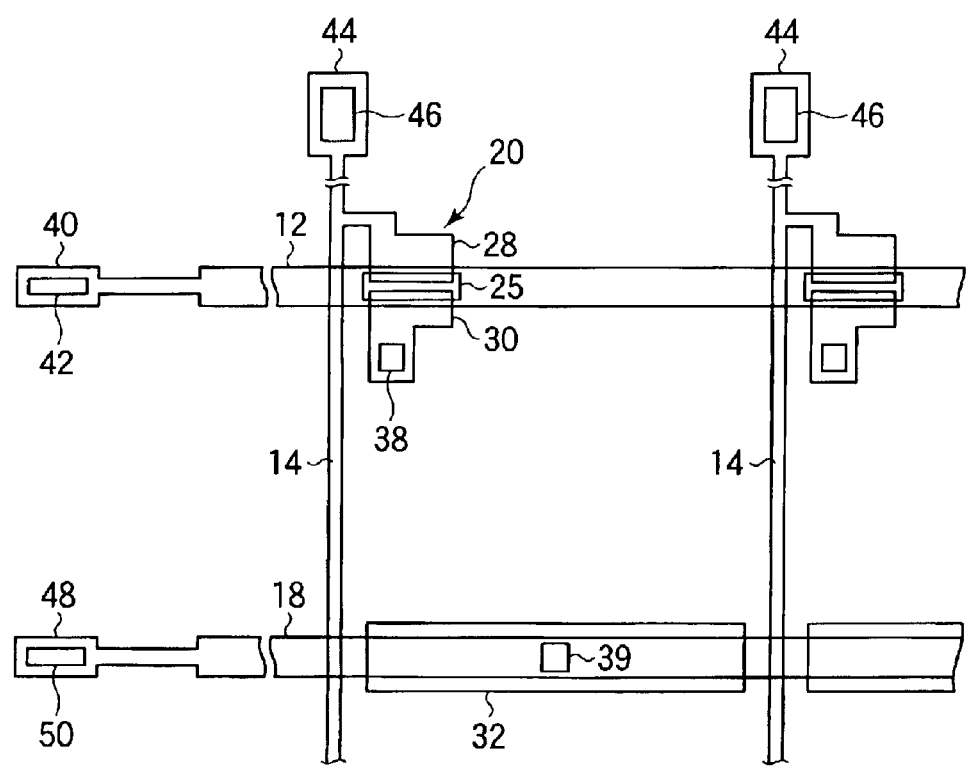
FIG. 16 shows the method of manufacturing the substrate for a liquid crystal display according to Embodiment 1—1 in the first mode for carrying out the invention.

Next, the protective film 36 is etched using the wrinkled resin layer 52 as an etching mask to form each of contact holes 38, 39 and 46 as shown in FIGS. 15A, 15C and FIG. 16, and the protective film 36 and the insulation film 22 are simultaneously etched to form each of contact holes 42 and 50 as shown in FIGS. 15B and 16. The etching is dry etching using an RIE process utilizing a fluorine type gas, for example. The etching is performed under conditions of 6.7 Pa, $SF_6/O_2$=200/200 (sccm) and 600 W. The sublimate of the resist formed in the regions α is removed by the etching.

Figure 17:
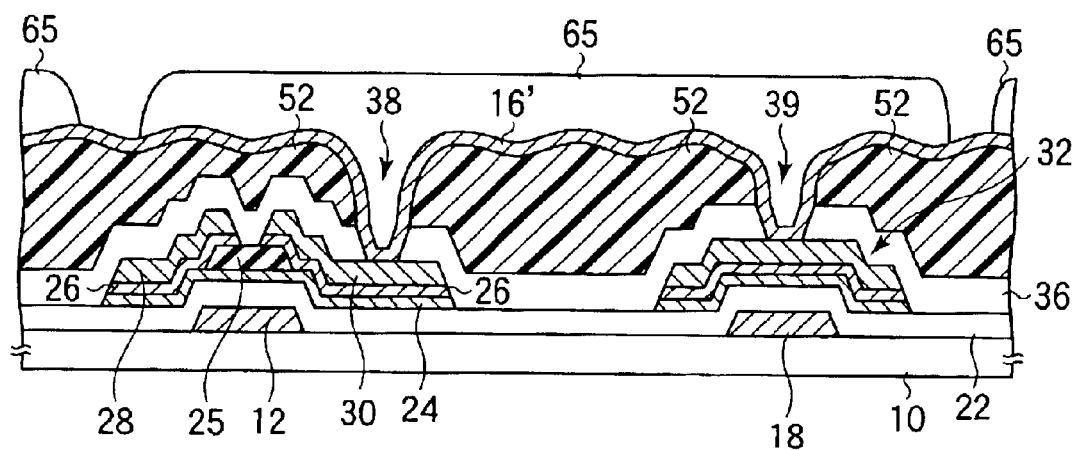
FIG. 17 is a sectional view taken in a process showing the method of manufacturing the substrate for a liquid crystal display according to Embodiment 1—1 in the first mode for carrying out the invention.
Figure 18:
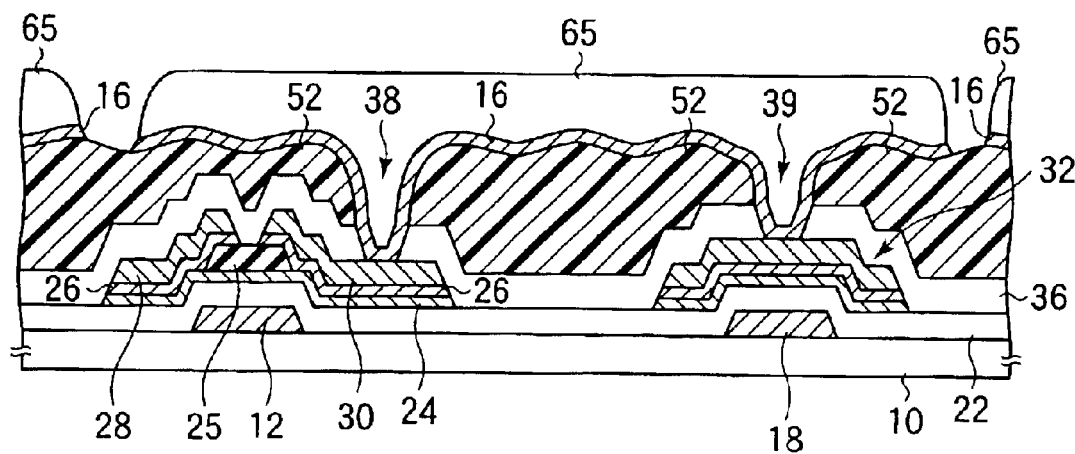
FIG. 18 is a sectional view taken in a process showing the method of manufacturing the substrate for a liquid crystal display according to Embodiment 1—1 in the first mode for carrying out the invention.

Next, as shown in FIG. 17, an Al film having a thickness of, for example, 150 nm is formed on the wrinkled resin layer 52 throughout the substrate using a PVD process, for example, to form a metal film 16'. A resist is then applied throughout a top surface of the metal film 16'. Next, patterning is performed using a fifth photo-mask to form a resist pattern 65. As shown in FIG. 18, wet etching is then performed with a mixture of a phosphoric acid, a nitric acid and an acetic acid using the resist pattern 65 as an etching mask to form a reflective electrode 16 at each of the pixel regions, a protective conductive film 41 on each of the gate bus line terminals 40, a protective conductive film 49 on each of the storage capacitor bus line terminals 48 and a protective conductive film 45 on each of the drain bus line terminals 44. The resist pattern 65 is then removed. A TFT substrate 2 that is a substrate for a liquid crystal display according to the present embodiment is completed through the above-described steps. Thereafter, the TFT substrate 2 is combined with a CF substrate 4 to seal a liquid crystal between them, which completes a liquid crystal display according to the present embodiment.

In the present embodiment, wrinkled recesses and projections are formed on the surface of the wrinkled resin layer 52 formed on the protective film 36. The reflective electrodes 16 formed on the wrinkled resin layer 52 are formed with wrinkles that follow the configuration of the surface of the wrinkled resin layer 52. Light that has entered from the display screen side can therefore be irregularly reflected by the reflective electrodes 16, which makes it possible to provide a reflective liquid crystal display having high luminance and a wide viewing angle.

In the present embodiment, the contact holes 38, 39, 42, 46 and 50 are formed after the wrinkled resin layer 52 is formed. It is therefore possible to remove a sublimate of the resist generated during baking of the resist when the contact holes 38, 39, 42, 46 and 50 are formed. Further, since the metal films are not exposed when the resist is baked, no thermal oxidation film is formed on the metal films. This makes it possible to avoid poor contact between the metal films attributable to a sublimate of the resist and a thermal oxidation film. Since the protective film 36 constituted by a SiN film is formed on the TFTs 20 after device isolation, contamination of the TFTs 20 due to the resist can be prevented.

Furthermore, since no photo-mask is used when recesses and projections are formed on the surface of the wrinkled resin layer 52 according to the present embodiment, one photo-mask can be reduced when compared to manufacturing steps according to the related art. Further, since the wrinkled resin layer 52 is used as an etching mask, another photo-mask can be reduced. Therefore, the number of photo-masks required is reduced from seven to five. This results in a reduction in steps for manufacturing a TFT substrate 2 and consequently makes it possible to reduce the manufacturing cost and to improve the yield of manufacture.

(Embodiment 1–2)

Figure 19:
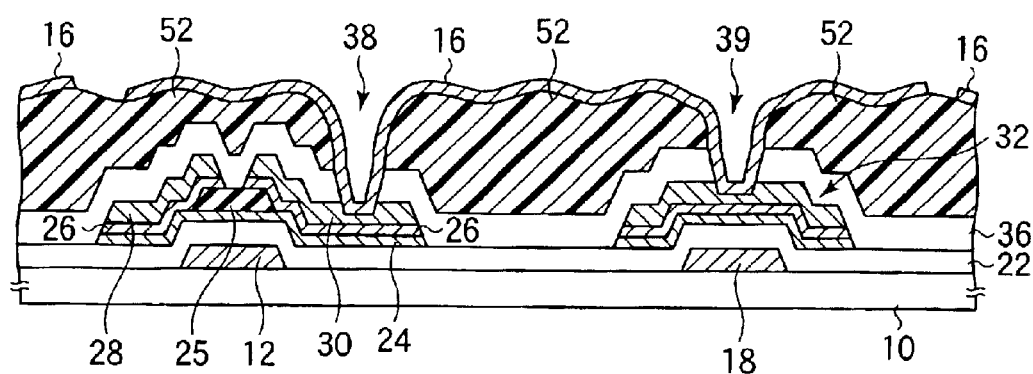
FIG. 19 is a sectional view showing a configuration of a substrate for a liquid crystal display according to Embodiment 1-2 in the first mode for carrying out the invention.

A description will now be made with reference to FIGS. 19 to 24 on a substrate for a liquid crystal display, a liquid crystal display having the same, and a method of manufacturing the same according to Embodiment 1–2 in the present mode for carrying out the invention. FIG. 19 shows a section of a substrate for a liquid crystal display according to the present embodiment corresponding to that shown in FIG. 3A. Elements having like functions and operations as those in Embodiment 1—1 are indicated by like reference numerals and will not be described here. As shown in FIG. 19, the surface of a region of a source electrode 30 that is connected to a reflective electrode 16 through a contact hole 38 is removed through etching. Similarly, the surface of a region of a storage capacitor electrode 32 that is connected to the reflective electrode 16 through a contact hole 39 is removed through etching. Although not shown, the surface of a region of a gate bus line terminal 40 that is connected to a protective conductive film 41 through a contact hole 42 is removed through etching. The surface of a region of a drain bus line terminal 44 that is connected to a protective conductive film 45 through a contact hole 46 is removed through etching. The surface of a region of a storage capacitor bus line terminal 48 that is connected to a protective conductive film 49 through a contact hole 50 is removed through etching.

Figure 20:
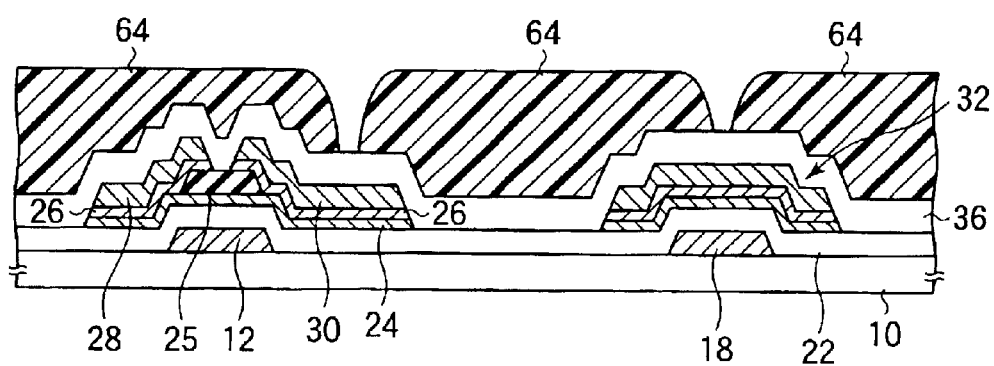
FIG. 20 is a sectional view taken in a process showing a method of manufacturing the substrate for a liquid crystal display according to Embodiment 1-2 in the first mode for carrying out the invention.

A description will now be made with reference to FIGS. 20 to 24 on a method of manufacturing the substrate for a liquid crystal display and a liquid crystal display having the same according to the present embodiment. Steps up to the formation of TFTs 20 will not be illustrated and described because they are the same as those in Embodiment 1—1 which has been described with reference to FIGS. 4 to 12. As shown in FIG. 20, a protective film 36 constituted by a SiN film having a thickness of, for example, 330 nm is formed using, for example, a plasma CVD process on drain electrodes 28, source electrodes 30 and storage capacitor electrodes 32 throughout the substrate. Next, a resist is applied on the protective film 36 throughout the substrate and patterned using a fourth photo-mask to form a resist pattern 64 having a predetermined configuration.

Figure 21:
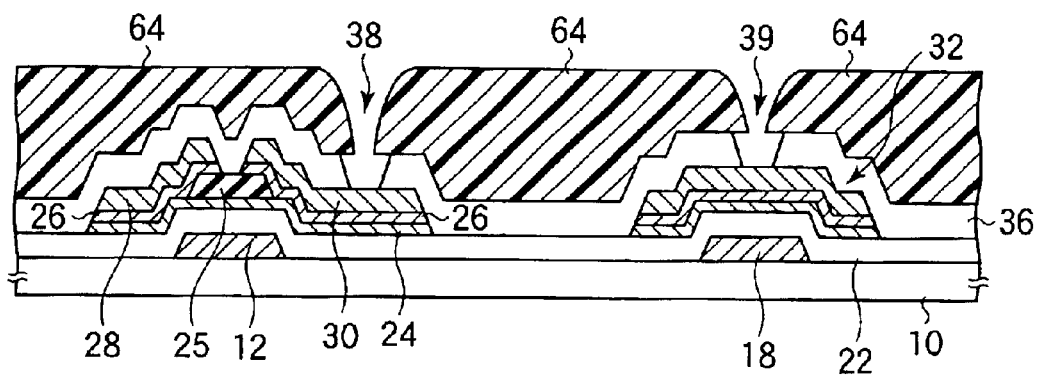
FIG. 21 is a sectional view taken in a process showing the method of manufacturing the substrate for a liquid crystal display according to Embodiment 1-2 in the first mode for carrying out the invention.

Next, as shown in FIG. 21, the protective film 36 and an insulation film 22 are etched at a time using the resist pattern 64 as an etching mask to form each of contact holes 38, 39, 42, 46 and 50 (the contact holes 42, 46 and 50 are not shown in FIG. 21). The etching performed here is dry etching using an RIE process utilizing a fluorine type gas, for example. For example, etching is performed under conditions of 6.7 Pa, $SF_6/O_2$=200/200 (sccm) and 600 W. The resist pattern 64 is then removed.

Figure 22:
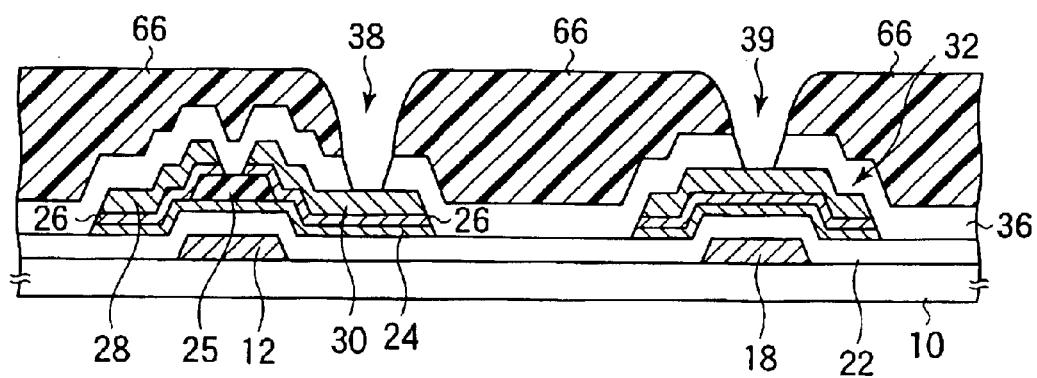
FIG. 22 is a sectional view taken in a process showing the method of manufacturing the substrate for a liquid crystal display according to Embodiment 1-2 in the first mode for carrying out the invention.
Figure 23:
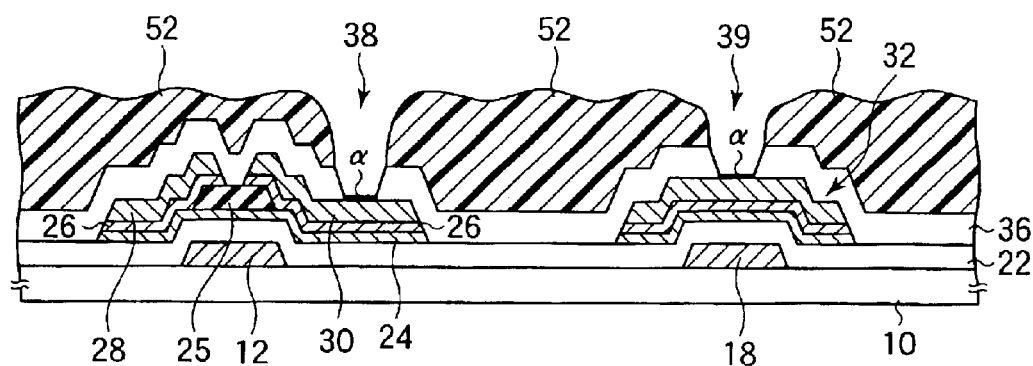
FIG. 23 is a sectional view taken in a process showing the method of manufacturing the substrate for a liquid crystal display according to Embodiment 1-2 in the first mode for carrying out the invention.

Next, as shown in FIG. 22, a positive resist having a thickness of, for example, about 3.5 $\mu$m (for forming a wrinkled resin layer 52) is applied on the protective film 36 throughout the substrate and patterned using a fifth photo-mask to form a resist pattern 66 that have openings located above the contact holes 38, 39, 42, 46 and 50. The contact holes 38, 39, 42, 46 and 50 can be formed only through exposure and developing. Next, after irradiating the surface of the resist pattern 66 with UV light, the resist pattern 66 is baked at a baking temperature of 200° C., for example. The UV light is preferably radiated at a radiation wavelength equal to or less than that of an i-ray (the wavelength being specifically in the range from 170 to 260 nm) and with a radiation energy of about 30 mJ. Thus, as shown in FIG. 23, a crosslinking reaction occurs only on the surface of the resist pattern 66 to form wrinkle-like recesses and projections, and a wrinkled resin layer 52 is thus provided. At this time, a thermal oxidation film and a sublimate of the resist generated on the surface of the metal film during baking of the resist or a residue of the resist remains in regions a.

Figure 24:
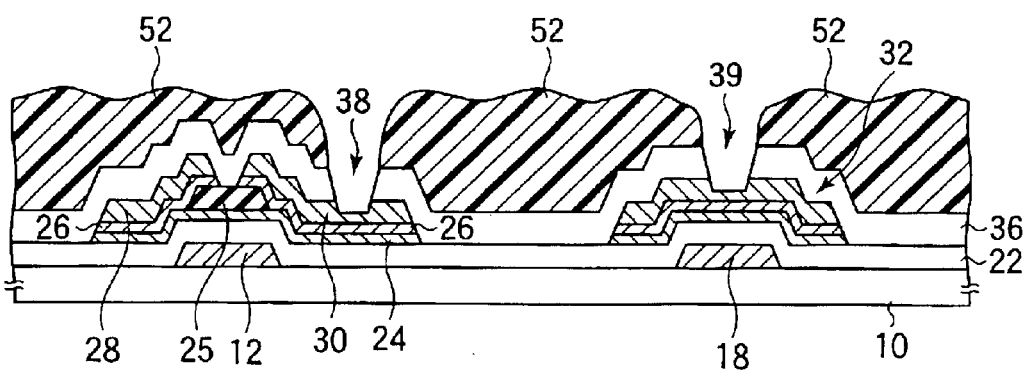
FIG. 24 is a sectional view taken in a process showing the method of manufacturing the substrate for a liquid crystal display according to Embodiment 1-2 in the first mode for carrying out the invention.

Next, as shown in FIG. 24, etching is performed using the wrinkled resin layer 52 as an etching mask to remove the surface of the regions of the source electrodes 30 where the contact holes 38 have been formed and the surface of the regions of the storage capacitor electrodes 32 where the contact holes 39 have been formed. Although not shown, etching is performed to simultaneously remove the surface of the regions of the gate bus line terminals 40 where the contact holes 42 have been formed, the surface of the regions of the drain bus line terminals 44 where the contact holes 46 have been formed, and the surface of the regions of the storage capacitor bus line terminals 48 where the contact holes 50 have been formed. The etching is dry etching using an RIE process, for example. The etching is performed under conditions of 6.0 Pa, $SF_6/O_2$=150/150 (sccm) and 600 W. The etching is performed to remove any thermal oxidation film and any sublimate of the resist formed in the regions $\alpha$.

Next, a metal film constituted by an Al film having a thickness of, for example, 150 nm is formed on the wrinkled resin layer 52 throughout the substrate using a PVD process, for example. A resist is then applied throughout a top surface of the metal film. Patterning is then performed using a sixth photo-mask to form a resist pattern. Wet etching is then performed with a mixture of a phosphoric acid, a nitric acid and an acetic acid using the resist pattern as an etching mask to form a reflective electrode 16 at each pixel region, a protective conductive film 41 on each of the gate bus line terminals 40, a protective conductive film 49 on each of the storage capacitor bus line terminals 48 and a protective conductive film 45 on each of the drain bus line terminals 44. The resist pattern is then removed. A TFT substrate 2 that is a substrate for a liquid crystal display according to the present embodiment is completed through the above-described steps. Thereafter, the TFT substrate 2 is combined with a CF substrate 4 to seal a liquid crystal between them, which completes a liquid crystal display according to the present embodiment.

In the present embodiment, wrinkle-like recesses and projections are formed on the surface of the wrinkled resin layer 52 formed on the protective film 36. The reflective electrodes 16 formed on the wrinkled resin layer 52 are formed with wrinkles that follow the configuration of the surface of the wrinkled resin layer 52. Light that has entered from the display screen side can therefore be irregularly reflected by the reflective electrodes 16, which makes it possible to provide a reflective liquid crystal display having high luminance and a wide viewing angle.

In the present embodiment, etching is performed after the wrinkled resin layer 52 is formed to remove any thermal oxidation film and any sublimate of the resist or any residue of the resist on the surface of the metal films generated in the regions α during baking of the resist. It is therefore possible to avoid poor contact between the metal films attributable to a thermal oxidation film or a sublimate of the resist. Since the protective film 36 constituted by a SiN film is formed on TFTs 20 after device isolation, contamination of the TFTs 20 due to the resist can be prevented.

Furthermore, since no photo-mask is used when recesses and projections are formed on the surface of the wrinkled resin layer 52 according to the present embodiment, one photo-mask can be reduced when compared to manufacturing steps according to the related art. Therefore, the number of photo-masks required is reduced from seven to six. This results in a reduction in steps for manufacturing a TFT substrate 2 and consequently makes it possible to reduce the manufacturing cost and to improve the yield of manufacture.

[Second Mode for Carrying out the Invention]

A description will now be made on a method of manufacturing a reflective liquid crystal display in a second mode for carrying out the invention and a liquid crystal display manufactured according to the same. The present mode for carrying out the invention relates to a method of manufacturing a reflective liquid crystal display having reflective electrodes formed on an organic resin film provided with fine recesses and projections and to a reflective liquid crystal display manufactured according to the method of manufacture.

The applicant has already proposed a method for forming recesses and projections in the form of fine wrinkles on a surface of a pixel electrode using a photoresist (JP-A-2002-221716). The method will be described below with reference to FIGS. 25A to 31.

Figure 25A:
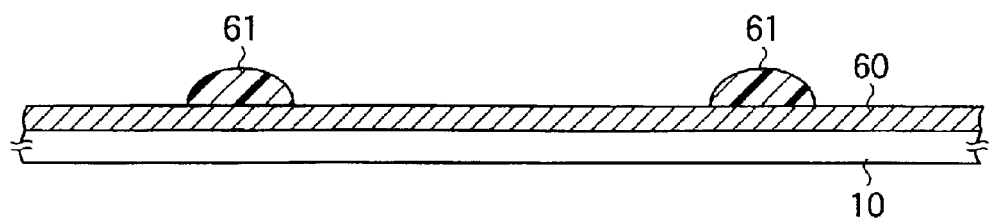
FIGS. 25A and 25B are (first) sectional views showing an example of a method of manufacturing a reflective liquid crystal display according to the related art.

As shown in FIG. 25A, a metal film 60 is first formed on a glass substrate 10 using a sputtering process, and a resist film 61 having a predetermined pattern is formed on the same using a photoresist.

Figure 25B:
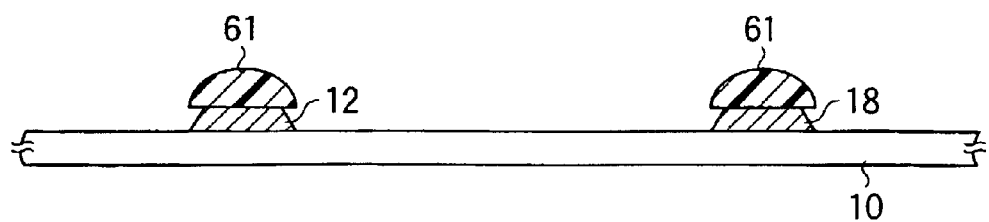

Next, as shown in FIG. 25B, the metal film 60 is etched using the resist film 61 as an etching mask to form gate bus lines 12 and storage capacitor bus lines 18. The resist film 61 is thereafter removed.

Figure 26A:
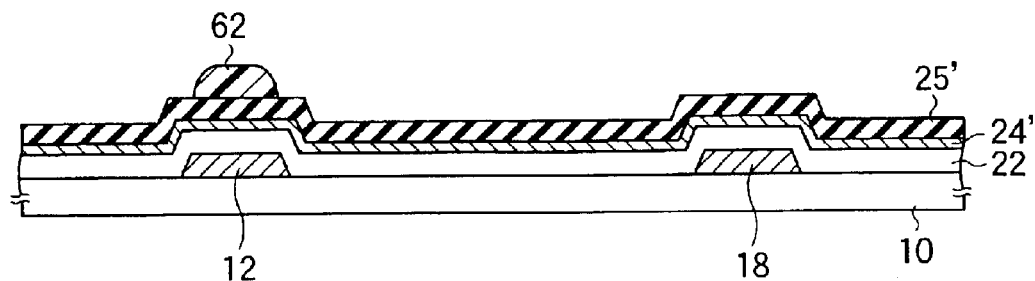
FIGS. 26A and 26B are (second) sectional views showing the example of the method of manufacturing a reflective liquid crystal display according to the related art.

Next, as shown in FIG. 26A, a gate insulation film 22 is formed throughout a top surface of the substrate 10 using a plasma CVD process, and an amorphous silicon film 24' to become active layers of TFTs and a SiN film 25' to become channel protection films are sequentially formed on the same.

A positive photoresist film is thereafter formed on the SiN film 25'. The photoresist film is exposed on the back side of the substrate 10 and is further exposed on the top side of the substrate 10 through a predetermined exposure mask, and a developing process is thereafter performed to form resist films 62 that cover regions where channel protection films are to be formed above the gate bus lines 12 on a self-alignment basis.

Figure 26B:
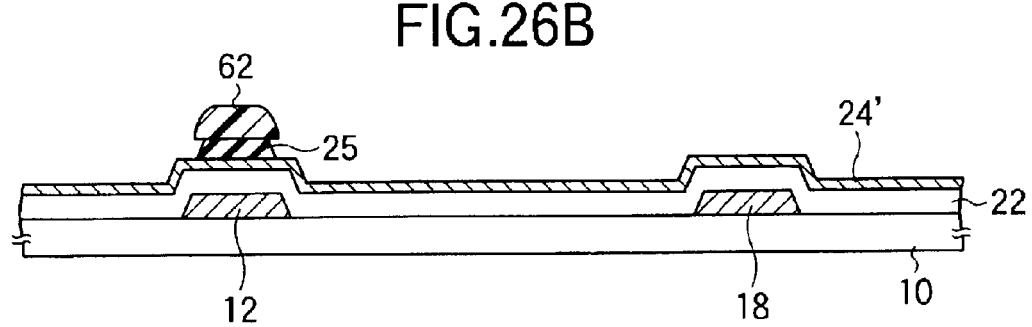

Next, as shown in FIG. 26B, the SiN film 25' is etched using the resist films 62 as a mask to form channel protection films 25. The resist films 62 are thereafter removed.

Figure 27A:
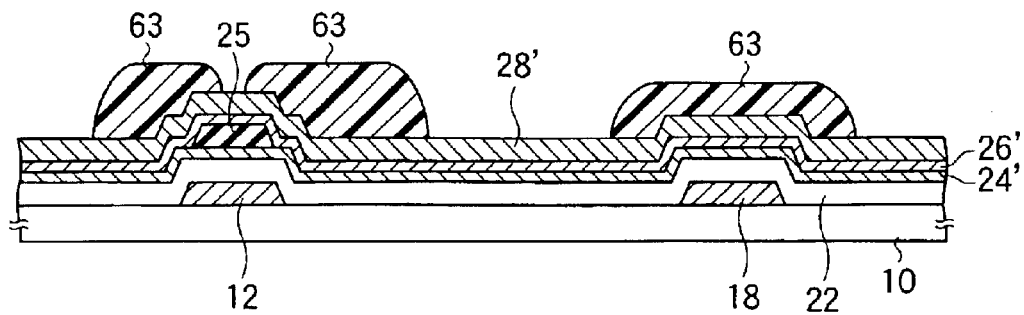
FIGS. 27A and 27B are (third) sectional views showing the example of the method of manufacturing a reflective liquid crystal display according to the related art.

Next, as shown in FIG. 27A, an n$^+$-type amorphous silicon film 26' to become an ohmic contact layer is formed on the entire surface of the top side of the substrate 10. Thereafter, a metal film 28' is formed on the n$^+$-type amorphous silicon film 26' using a PVD process. A resist film 63 having a predetermined pattern is then formed on the metal film 28' using a photoresist.

Figure 27B:
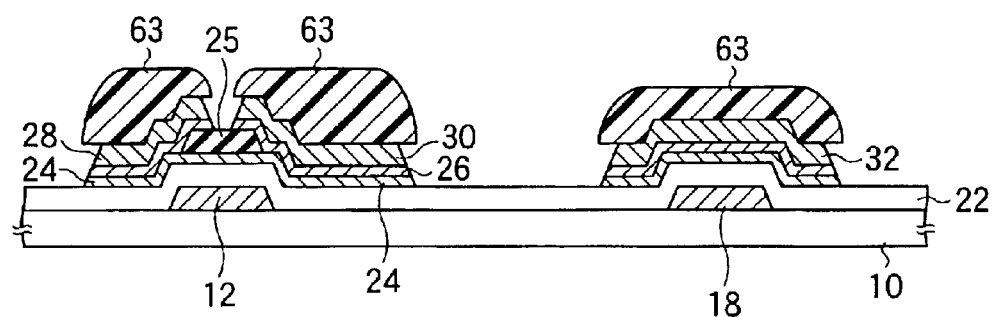

Next, as shown in FIG. 27B, the metal film 28', the n$^+$-type amorphous silicon film 26' and the amorphous silicon film 24' are etched using the resist film 63 as a mask to define the configuration of amorphous silicon films 24 to become active layers of TFTs and to form data bus lines (drain bus lines) 14, source electrodes 30, drain electrodes 28 and storage capacitor electrodes 32. At this time, regions of the amorphous silicon films 24 to become channels of the TFTs are protected by the channel protection films 25. The resist film 63 is thereafter removed.

Figure 28A:
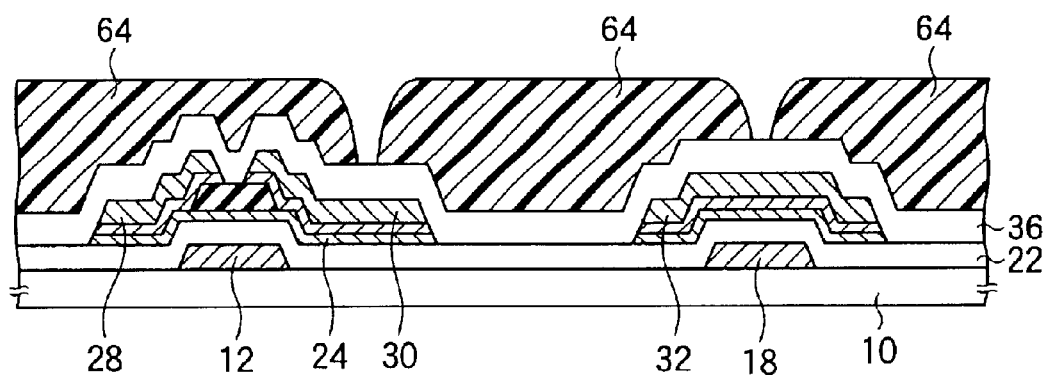
FIGS. 28A and 28B are (fourth) sectional views showing the example of the method of manufacturing a reflective liquid crystal display according to the related art.

Next, as shown in FIG. 28A, a final protective film 36 constituted by a transparent insulation film is formed on the entire surface of the top side of the substrate 10. The final protection film 36 is formed of SiN, for example. A resist film 64 having openings in positions where contact holes are to be formed is then formed on the final protective film 36.

Figure 28B:
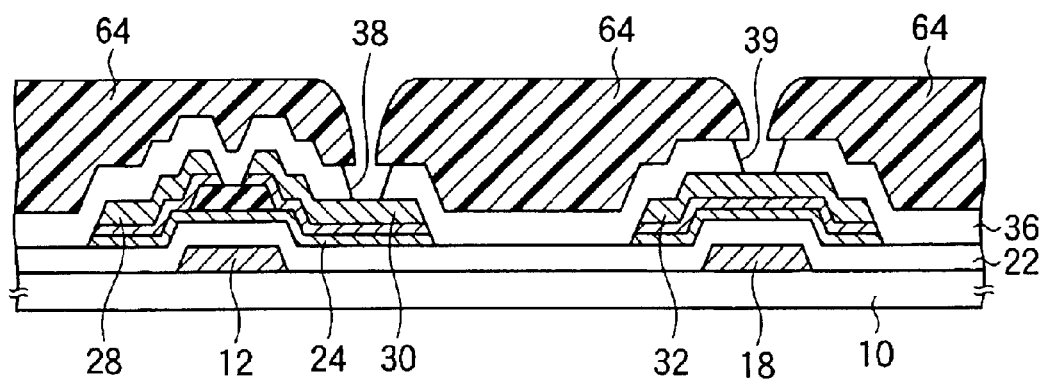

Next, as shown in FIG. 28B, the final protective film 36 is etched using the resist film 64 as a mask to form contact holes 38 and 39 that extend to reach the source electrodes 30 and the storage capacitor electrodes 32, respectively. The resist film 64 is thereafter removed.

Figure 29A:
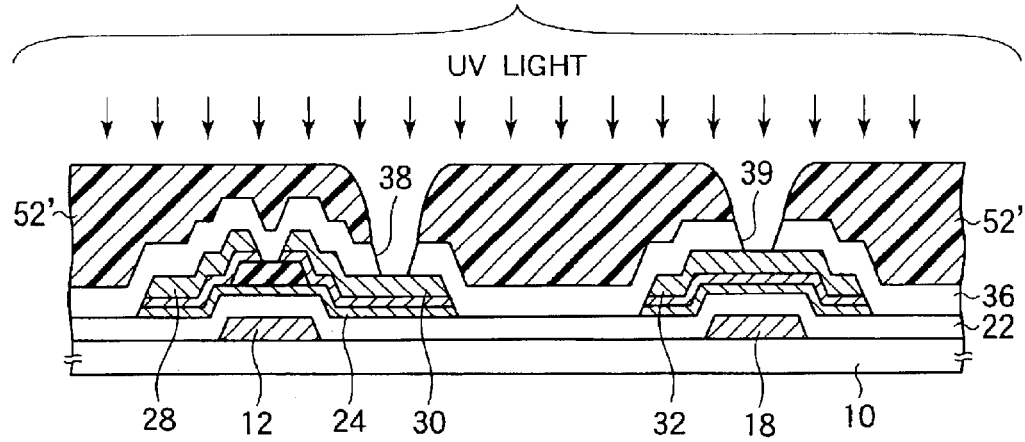
FIGS. 29A and 29B are (fifth) sectional views showing the example of the method of manufacturing a reflective liquid crystal display according to the related art.
Figure 29B:
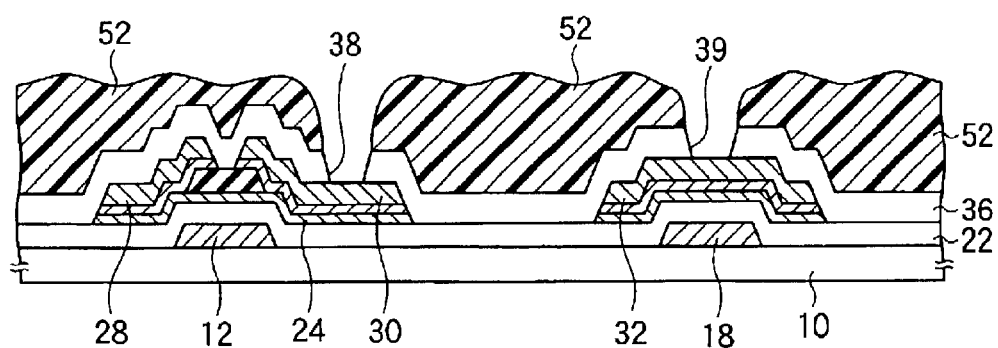

Next, as shown in FIG. 29A, a positive photoresist film 52' is formed on the entire surface of the top side of the substrate 10, and exposure and developing processes are performed to form openings where the contact holes 38 and 39 are exposed. Thereafter, post-baking is performed at a temperature in the range from 130 to 145° C., and a surface layer of the resist film 52' is then irradiated with UV light to crosslink polymers in the surface layer. The dose of the UV light at this time is in the range from about 1000 to 6000 mJ/cm$^2$. When thermal baking is then performed at a temperature of 200° C. or more, since the surface layer (the crosslinked section) and a deep section (a section where no crosslinking has occurred) of the resist film 52' have different thermal deformation characteristics (thermal expansion coefficients or thermal absorption factors), fine wrinkle-like recesses and projections are formed on the surface of the resist film 52, as shown in FIG. 29B.

Figure 30A:
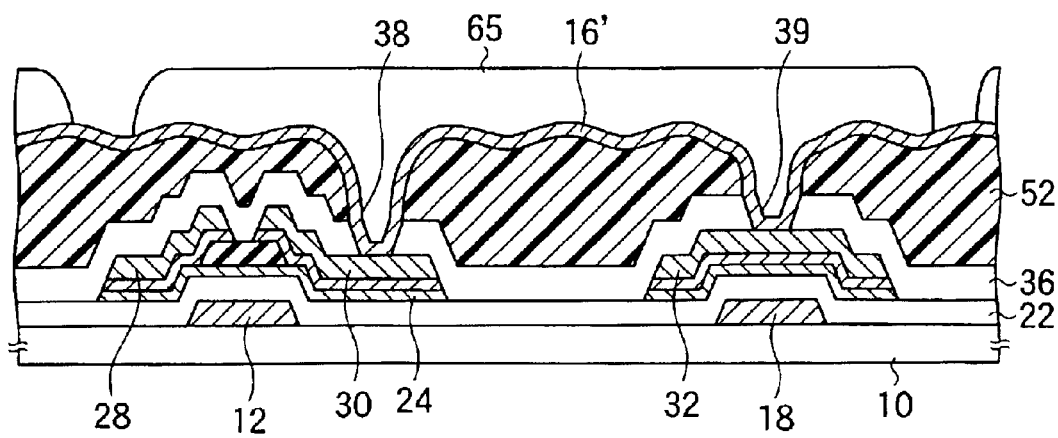
FIGS. 30A and 30B are (sixth) sectional views showing the example of the method of manufacturing a reflective liquid crystal display according to the related art.

Next, as shown in FIG. 30A, Al is sputtered on to the top side of the substrate 10 to form a metal film 16' made of Al on the resist film 52. Since fine recesses and projections are provided on the surface of the resist film 52, recesses and projections are also formed on the surface of the metal film 16'. The metal film 16' is electrically connected to the source electrodes 30 and the storage capacitor electrodes 32 through the contact holes 38 and 39. A resist film 65 having a predetermined pattern for defining pixel electrodes is thereafter formed on the metal film 16'.

Figure 30B:
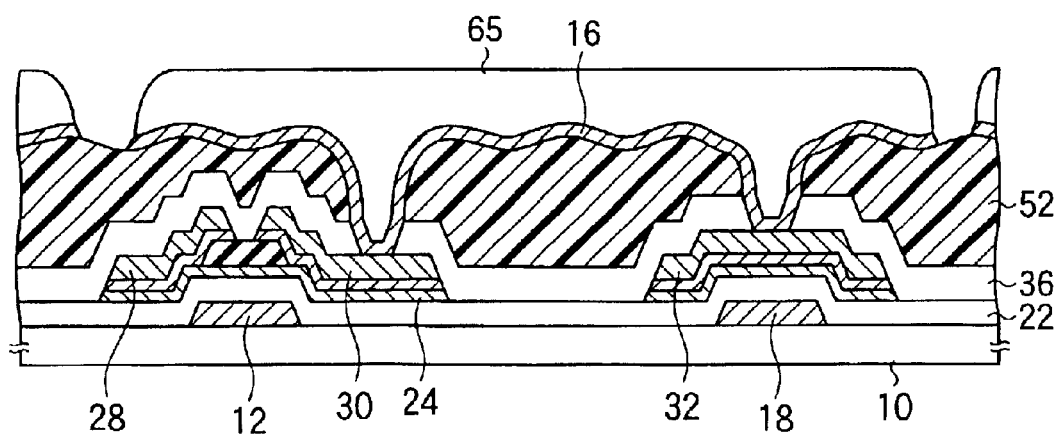
Figure 31:
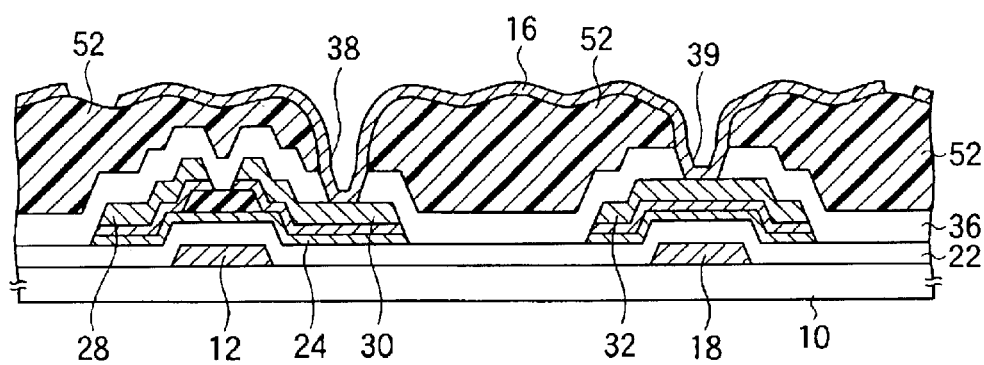
FIG. 31 is a (seventh) sectional view showing the example of the method of manufacturing a reflective liquid crystal display according to the related art.

Next, as shown in FIG. 30B, the metal film 16' is etched using the resist film 65 as a mask to form pixel electrodes (reflective electrodes) 16 that are separated to serve each pixel. The resist film 65 is thereafter removed as shown in FIG. 31. Thus, pixel electrodes 16 having fine recesses and projections on a surface thereof are formed.

According to the above-described method of manufacturing a reflective liquid crystal display, only the surface layer of the photoresist film 52' is irradiated with UV light to cause crosslinking, and a thermal process is thereafter performed to form wrinkle-like recesses and projections on the photoresist film 52. In this case, what is important is the illumination of the UV light and the illumination distribution of the same, and the recesses and projections become irregular when there are variations of such parameters. It is however difficult to irradiate a large substrate as a whole with UV light uniformly with high reproducibility.

According to the above-described method, post-baking is performed at a temperature in the range from 130 to 145° C. after the forming the openings that lead to the contact holes 38 and 39 in the photoresist film 52'. It has been revealed that the temperature of the post-baking relates to the inclinations and pitches of the recesses and projections, and it has been found that recesses and projections cannot be formed on a photoresist film when the temperature of post-baking is 150° C. or more according to the above-described method utilizing UV light.

For example, it is preferable to form relatively coarse recesses and projections in the case of a small-sized liquid crystal display to be used in a PDA, and it is preferable to form relatively fine recesses and projections in the case of a medium-sized liquid crystal display to be used in a notebook type PC. However, the above-described method cannot satisfy such needs.

In the case of a post-baking temperature lower than 130° C., $N_2$ in the resist film 52' cannot be sufficiently removed, which can cause exposure bursting during irradiation with UV light.

Under such circumstances, the present mode for carrying out the invention is aimed at providing a method of manufacturing a reflective liquid crystal display in which the inclinations and pitches of recesses and projections of a resist film can be accurately controlled to provide reflective electrodes having no unevenness of recesses and projections thereof and providing a reflective liquid crystal display manufactured according to such a method of manufacture.

The above-described problems are solved by a method of manufacturing a reflective liquid crystal display, characterized in that it has the steps of: applying an organic resin on to a substrate to form an organic resin film; baking the organic resin film, applying charged particles to the organic resin film to harden only a surface layer thereof; performing a thermal process on the organic resin film to form wrinkle-like recesses and projections on a surface thereof; and forming a reflective electrode on the organic resin film.

The above-described problems are solved by a method of manufacturing a reflective liquid crystal display, characterized in that it has the steps of: forming a gate bus line to which a scan signal is supplied, a data bus line to which a display signal is supplied, and a thin film transistor whose gate electrode is connected to the gate bus line and whose drain electrode is connected to the data bus line on a first substrate; forming an insulation film above the gate bus line, the data bus line, and the thin film transistor; forming a first photoresist film on the insulation film; performing first exposure and developing to form an opening in a position of the first photo-resist film associated with a source electrode of the thin film transistor; etching the insulation film using the first photoresist film as a mask to form a contact hole that leads to the source electrode of the thin film transistor; removing the first photoresist film; forming a second-photoresist film on the insulation film; performing second exposure and developing to form an opening in a position of the second photoresist film associated with the contact hole; introducing charged particles in a surface layer of the second photoresist film; performing a thermal process on the second photoresist film to form wrinkle-like recesses and projections on a surface thereof; forming a conductive reflective film throughout a top surface of the second photoresist film; patterning the reflective film to form a first electrode; and arranging a second substrate having a second electrode comprising a conductor film provided thereon and the first substrate opposite to each other and sealing a liquid crystal between them.

The above-described problems are solved by a method of manufacturing a liquid crystal display, characterized in that it has the steps of: forming a gate bus line to which a scan signal is supplied, a data bus line to which a display signal is supplied, and a thin film transistor whose gate electrode is connected to the gate bus line and whose drain electrode is connected to the data bus line on a first substrate; forming an insulation film above the gate bus line, the data bus line; and the thin film transistor; forming a photoresist film on the insulation film; performing exposure and developing to form an opening in a position of the photoresist film associated with a source electrode of the thin film transistor; etching the insulation film using the photoresist film as a mask to form a contact hole that leads to the source electrode of the thin film transistor; introducing charged particles in a surface layer of the photoresist film; performing a thermal process on the photoresist film to form wrinkle-like recesses and projections on a surface thereof; forming a conductive reflective film throughout a top surface of the photoresist film; patterning the reflective film to form a first electrode; and arranging a second substrate having a second electrode comprising a conductor film provided thereon and the first substrate opposite to each other and sealing a liquid crystal between them.

The above-described problems are solved in a reflective liquid crystal display characterized in that it is formed by sealing a liquid crystal between a pair of substrates and in that, on either of the pair of substrates, it has a gate bus line to which a scan signal is supplied, a data bus line to which a display signal is supplied, a thin film transistor whose gate electrode is connected to the gate bus line and whose drain electrode is connected to the data bus line on a first substrate; an organic resin film formed above the gate bus line, the data bus line, and the thin film transistor and provided with wrinkle-like recesses and projections on a surface thereof; and a reflective electrode formed on the organic resin film and provided with recesses and projections that follow the recesses and projections of the organic resin film, the recesses and projections of the organic resin film being formed by performing a thermal process after introducing charged particles in a surface layer thereof.

In the present mode for carrying out the invention, only a surface layer of an organic resin film is hardened by applying charged particles to the same, and a thermal process is thereafter performed to form wrinkle-like recesses and projections on a surface of the organic resin film. For example, processes for applying charged particles to the organic resin include an ion doping process, reactive ion plasma etching process, electron cyclotron resonance plasma process, ICP (inductively coupled plasma) process and TCP (transformer coupled plasma) process.

The charged particles applied to the organic resin film are converted into a thermal energy in the surface layer of the organic resin film to cause a thermal crosslinking reaction. As a result, only the surface layer of the organic resin film is hardened. When a thermal process is thereafter performed, since the surface layer of the organic resin film (the section where crosslinking has occurred) and a deep section (a section where no crosslinking has occurred) of the same have different thermal deformation characteristics (thermal expansion coefficients or thermal absorption factors), recesses and projections are formed on the surface of the organic resin film.

According to the method of hardening a surface layer of an organic resin film by applying chargedparticles to the organic resin film using an ion doping process or RIE process, charged particles can be uniformly applied to an organic resin film as a whole on a substrate even when a large substrate is used. The method is also better in reproducibility of a dose than irradiation with UV light. It is therefore possible to form fine wrinkle-like recesses and projections uniformly with high reproducibility on a surface of a resist film.

An experiment conducted by the inventors has revealed that recesses and projections are formed even at a baking temperature of 165° C. when only a surface layer of an organic resin film is hardened by charged particles. This is considered attributable to the fact that the use of charged particles results in a great difference between thermal deformation characteristics (thermal expansion coefficients or thermal absorption factors) of a hardened section and an unhardened section because their energy is higher than that of UV light. That is, the present mode for carrying out the invention makes it possible to change the inclinations and pitches of recesses and projections greatly because it allows the use of a wide range of baking temperatures.

The present mode for carrying out the invention will now be described with reference to the accompanying drawings.

(Reflective Liquid Crystal Display)

Figure 32:
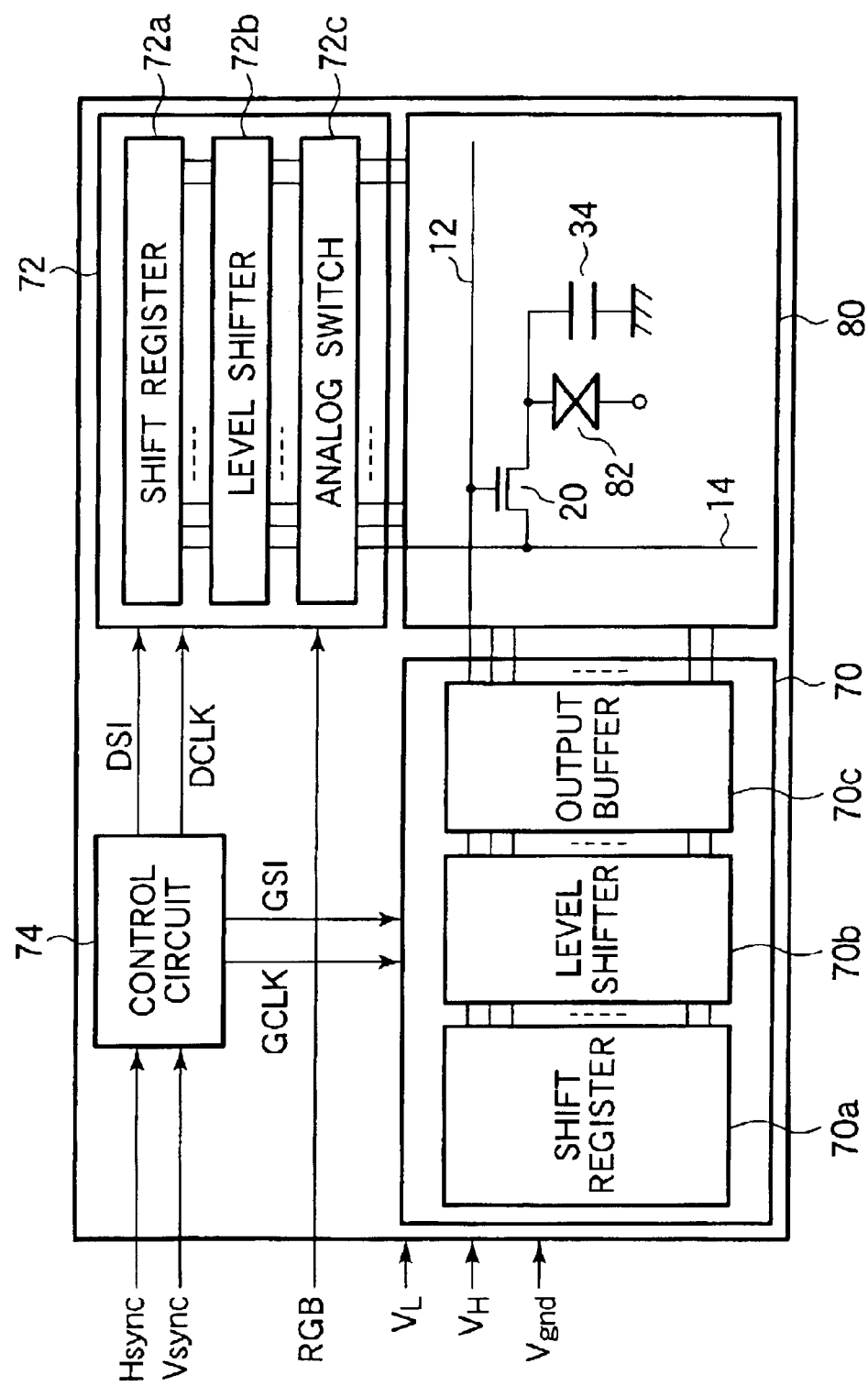
FIG. 32 is a block diagram showing a reflective liquid crystal display in a second mode for carrying out the invention.

FIG. 32 is a block diagram showing a reflective liquid crystal display in the present mode for carrying out the invention.

The liquid crystal display is constituted by a control circuit 74, a data driver (drain bus line driving circuit) 72, a gate driver (gate bus line driving circuit) 70 and a display section 80. Signals such as display signals (an R (red) signal, a G (green) signal and a B (blue) signal), a horizontal synchronization signal $H_{sync}$ and a vertical synchronization signal $V_{sync}$ are supplied from an external apparatus such as a computer (not shown) to the liquid crystal display, and a high voltage $V_H$ (e.g., 18 V), a low voltage $V_L$ (e.g., 3.3 V or 5 V) and a ground voltage $V_{gnd}$ are supplied from a power supply (not shown) to the same.

In the display section 80, a multiplicity of pixels (subpixels) are arranged in horizontal and vertical directions. One pixel is constituted by a TFT 20, a display cell 82 connected to a source electrode of the TFT 20 and a storage capacitor 34. The display cell 82 is constituted by a pair of electrodes (a pixel electrode and a common electrode), a liquid crystal between the electrodes and a polarizer.

The display section 80 is also provided with a plurality of gate bus lines 12 extending in the horizontal direction and a plurality of data bus lines 14 extending in the vertical direction. Gate electrodes of TFTs 20 arranged in the horizontal direction are connected to the same gate bus line 12, and drain electrodes of TFTs 20 arranged in the vertical direction are connected to the same data bus line 14.

The horizontal synchronization signal $H_{sync}$ and the vertical synchronization signal $V_{sync}$ are input to the control circuit 74 which in turn outputs a data start signal DSI that is activated at the beginning of one horizontal synchronization period, a data clock DclK that divides one horizontal synchronization period into constant intervals, a gate start signal GSI that is activated at the beginning of one vertical synchronization period and a gate clock GclK that divides one vertical synchronization period into constant intervals.

The data driver 72 is constituted by a shift register 72a, a level shifter 72b and an analog switch 72c.

The shift register 72a has a plurality of output terminals. The shift register 72a is initialized by the data start signal DSI, and it sequentially outputs active signals at a low voltage from the output terminals at timing that is in synchronism with the data clock DclK.

The level shifter 72b has a plurality of input terminals and a plurality of output terminals. It converts the active signals at a low voltage output by the shift register 72a into a high voltage and outputs the same.

The analog switch 72c also has a plurality of input terminals and a plurality of output terminals. The output terminals of the analog switch 72c are connected to respective data bus lines 14. When an active signal is input from the level shifter 72b, the analog switch 72c outputs a display signal (any of R, G and B signals) at the output terminal associated with the input terminal to which the active signal has been input.

That is, the data driver 72 sequentially outputs display signals (R, G and B signals) to the data bus lines 14 of the display section 80 at timing that is in synchronism with the data clock DclK in one horizontal synchronization period.

The gate driver 70 is constituted by a shift register 70a, a level shifter 70b and an output buffer 70c.

The shift register 70a has a plurality of output terminals. The shift register 70a is initialized by the gate start signal GSI, and it sequentially outputs scan signals at a low voltage from the output terminals at timing that is in synchronism with the gate clock GclK.

The level shifter 70b has a plurality of input terminals and a plurality of output terminals. It converts the scan signals at a low voltage output by the shift register 70a into a high voltage and outputs the same.

The output buffer 70c also has a plurality of input terminals and a plurality of output terminals. The output terminals of the output buffer 70c are connected to respective gate bus lines 12. The output buffer 70c supplies a scan signal input from the level shifter 70b to a gate bus line 12 through the output terminal associated with the input terminal.

That is, the gate driver 70 sequentially outputs scan signals to the gate bus lines 12 of the display section 80 at timing that is in synchronism with the gate clock GclK in one vertical synchronization period.

A TFT 20 of the display section 80 is turned on when a scan signal is supplied to the gate bus line 12. When a display signal (any of R, G and B signals) is supplied to the data bus line 14 at this time, the display signal is written in the display cell 82 and the storage capacitor 34. In the display cell 82, the tilt of liquid crystal molecules is changed by the written display signal, and optical reflectivity of the display cell 82 consequently changes. A desired image can be displayed by controlling the optical reflectivity of the display cell 82 at each pixel.

Figure 33:
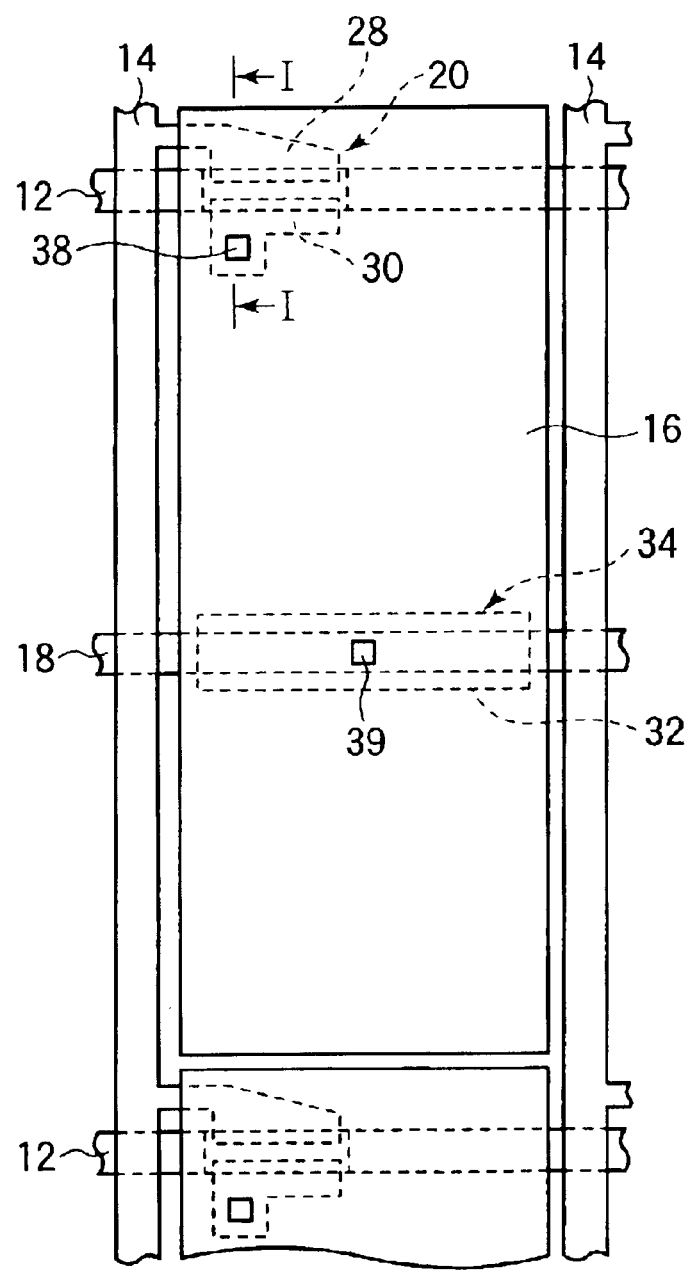
FIG. 33 is a plan view showing one pixel of the reflective liquid crystal display in the second mode for carrying out the invention.
Figure 34:
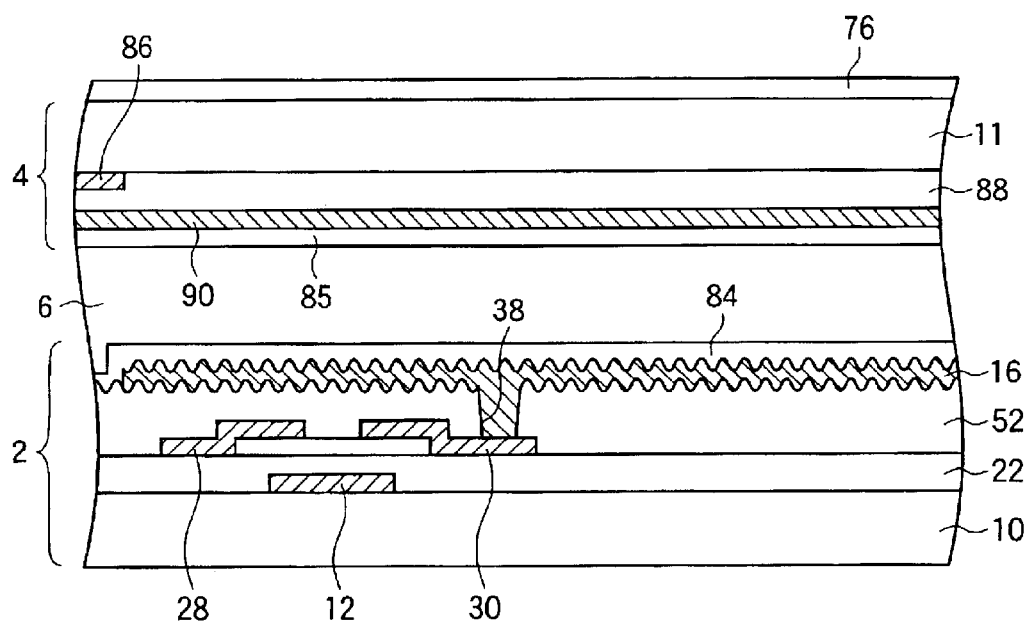
FIG. 34 is a sectional view taken along the line I—I in FIG. 33.

FIG. 33 is a plan view showing one pixel of the reflective liquid crystal display, and FIG. 34 is a sectional view taken along the line I—I in FIG. 33.

As shown in FIG. 34, the liquid crystal display in the present mode for carrying out the invention is constituted by a TFT substrate 2 and a CF substrate 4 that are provided opposite to each other, a liquid crystal 6 sealed between the TFT substrate 2 and the CF substrate 4 and a polarizer 76 provided on the CF substrate 4.

As shown in FIGS. 33 and 34, the TFT substrate 2 is constituted by a glass substrate 10, gate bus lines 12, storage capacitor bus lines 18, data bus lines 14, TFTs 20, storage capacitor electrodes 32 and pixel electrodes (reflective electrodes) 16 formed on the glass substrate 10.

As shown in FIG. 34, fine wrinkle-like recesses and projections are provided on a resist film 52 under pixel electrodes 16, and recesses and projections that follow the recesses and projections on the resist film 52 are provided on the surface of the pixel electrodes 16.

The storage capacitor bus lines 18 are formed in the same wiring layer in which the gate bus lines 12 exist and are provided in parallel with the gate bus lines 12. The storage capacitor electrodes 32 are formed on the storage capacitor bus lines 18 with an insulation film (gate insulation film) 22 interposed therebetween, and storage capacities 34 as shown in FIG. 32 are constituted by the storage capacitor electrodes 32, the storage capacitor bus lines 18, and the insulation film 20 between them. The storage capacitor electrodes 32 are electrically connected to the pixel electrodes 16 through contact holes 39.

Further, in the present mode for carrying out the invention, a part of the gate bus lines 12 serve as gate electrodes of the TFTs 20; source electrodes 30 of the TFTs 20 are connected to the pixel electrodes 16 through contact holes 38; and drain electrodes 28 of the same are connected to the data bus lines 14, as shown in FIG. 33. Furthermore, an alignment film 84 is formed of polyimide on the pixel electrodes 16 to determine the aligning direction of liquid crystal molecules when no electric field is applied.

The CF substrate 4 is constituted by a glass substrate (transparent insulated substrate) 11 and a black matrix 86, CF layers 88 and a common electrode 90 formed on one side of the glass substrate 11 (bottom side in FIG. 34). The black matrix 86 is formed such that it covers regions between adjoining pixel electrodes 16. Under the glass substrate 11, a CF layer 88 in any of red, green or blue is formed at each pixel. Further, the common electrode 90 is formed under the CF layers 88, and an alignment film 85 is formed under the common electrode 90.

The TFT substrate 2 and the CF substrate 4 are provided such that their surfaces having the alignment films 84 and 85 formed thereon face each other, and they constitute a liquid crystal panel in combination with the liquid crystal 6 sealed between them. The control circuit 74, the data driver 72 and the gate driver 70 may be formed integrally with the liquid crystal panel, and those circuits may alternatively be formed on another substrate and may be electrically connected to the liquid crystal panel through a flexible substrate.

(Embodiment 2–1)

A description will now be made on a method of manufacturing a reflective liquid crystal display according to Embodiment 2–1 in the present mode for carrying out the invention.

First, a method of manufacturing a TFT substrate 2 will be described. FIGS. 35A to 40 are sectional views showing a method of manufacturing a TFT substrate 2 of a liquid crystal display according to the present embodiment in the order of steps.

Figure 35A:
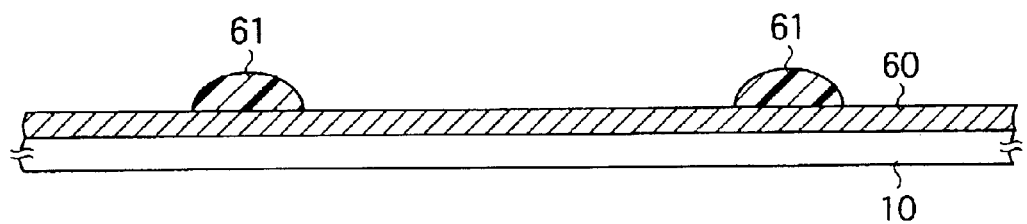
FIGS. 35A and 35B are (first) sectional views showing a method of manufacturing a liquid crystal display according to Embodiment 2-1 in a second mode for carrying out the invention.

First, as shown in FIG. 35A, a metal film 60 is formed on a glass substrate 10 using a PVD process, and a resist film 61 having a predetermined pattern is formed on the same using a photoresist. For example, the metal film 60 is formed by stacking an Al film having a thickness of 150 nm, a MoN (molybdenum nitride) film having a thickness of 90 nm and a Mo film having a thickness of 10 nm in the order listed that is the order of their closeness to the substrate. The metal film 60 may be made up of Cr or an Al alloy or Al and Ti films stacked one over the other.

Figure 35B:
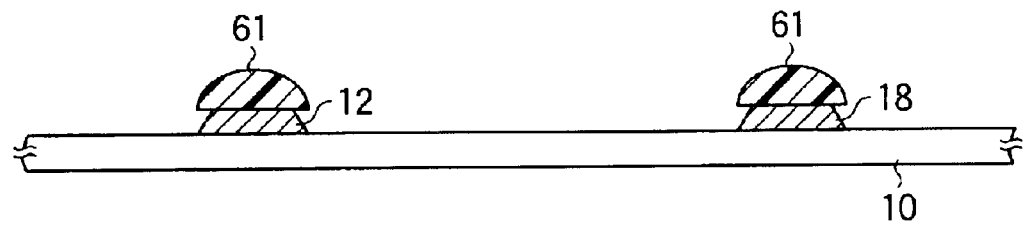

Next, as shown in FIG. 35B, the metal film 60 is etched using the resist film 61 as a mask to form gate bus lines 12 and storage capacitor bus lines 18. When the metal film 60 is formed of Al, MoN and Mo, wet etching is performed using a mixture of a phosphoric acid, a nitric acid and an acetic acid as an etchant, for example. When the metal film 60 is made of Cr, wet etching is performed using a Cr etchant. When the metal film 60 is made up of an Al alloy or Al and Ti films stacked one over the other, dry etching is performed using a chlorine type gas.

The resist film 61 is removed after forming the gate bus lines 12 and the storage capacitor bus lines 18 as thus described.

Figure 36A:
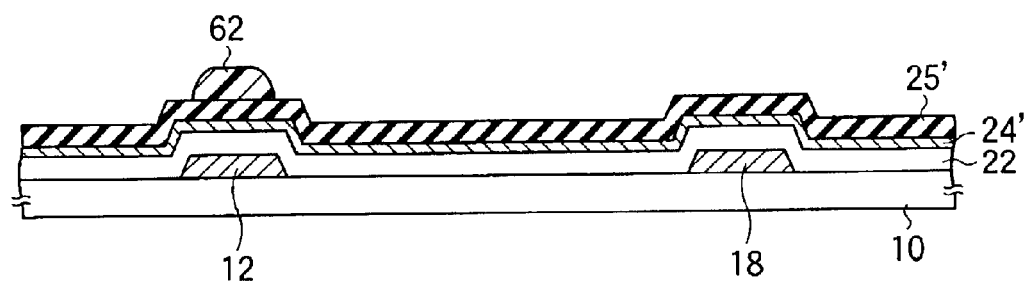
FIGS. 36A and 36B are (second) sectional views showing the method of manufacturing a liquid crystal display according to Embodiment 2-1 in the second mode for carrying out the invention.

Next, as shown in FIG. 36A, a gate insulation film 22 made of SiN is formed throughout a top surface of the glass substrate 10 using a plasma CVD process. Further, an amorphous silicon film 24' to become an active layer of a TFT 20 and a SiN film 25' to become a channel protection film are formed in the order listed on the gate insulation film 22. The thickness of the gate insulation film 22 is 350 nm, for example. The thickness of the amorphous silicon film 24' is 30 nm for example, and the thickness of the SiN film 25' is 120 nm for example.

Thereafter, a positive photoresist film is formed on the SiN film 25'. The photoresist film is then exposed on the bottom side of the substrate 10 and is further exposed on the top side of the substrate 10 through a predetermined exposure mask, and a developing process is thereafter performed to form a resist film 62 that covers the region to form a channel protection film above the gate bus line 12 on a self-alignment basis.

Figure 36B:
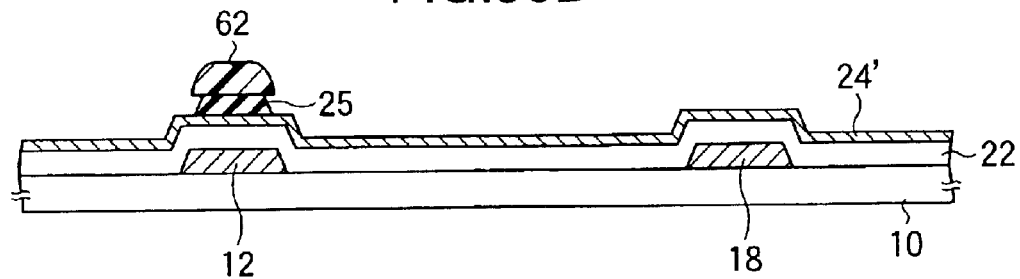

Next, the SiN film 25' is etched using the resist film 62 as a mask to form a channel protection film 25, as shown in FIG. 36B. The resist film 62 is thereafter removed.

Figure 37A:
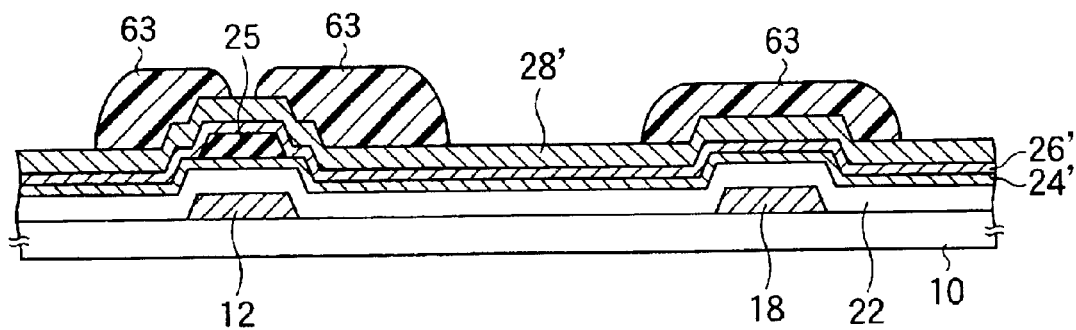
FIGS. 37A and 37B are (third) sectional views showing the method of manufacturing a liquid crystal display according to Embodiment 2-1 in the second mode for carrying out the invention.

Next, as shown in FIG. 37A, an $n^+$-type amorphous silicon film 26' to become an ohmic contact layer is formed on the entire surface of the top side of the substrate 10 using a PVD process. Thereafter, a metal layer 28' is formed on the $n^+$-type amorphous silicon film 26' using a PVD process. For example, the thickness of the $n^+$-type amorphous silicon film 26' is 30 nm. For example, the metal film 28' has a layer structure consisting of three layers, i.e., a Ti film having a thickness of 20 nm, an Al film having a thickness of 75 nm and a Ti film having a thickness of 80 nm.

Thereafter, a resist film 63 having a predetermined pattern is formed on the metal film 28' using a photoresist.

Figure 37B:
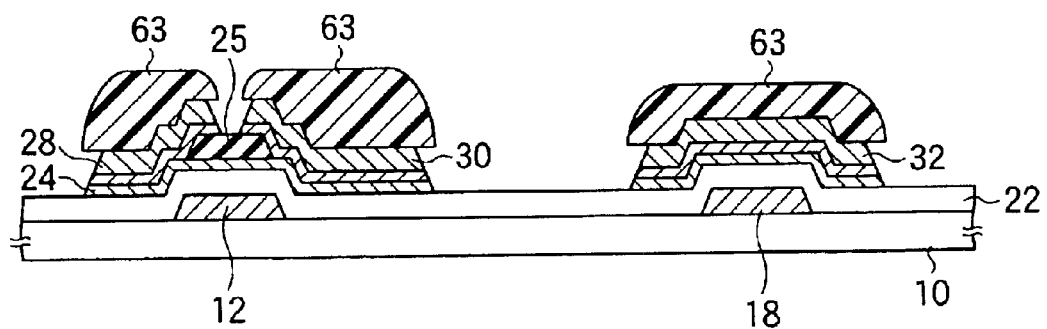

Next, as shown in FIG. 37B, the metal film 28', the $n^+$-type amorphous silicon film 26' and the amorphous silicon film 24' are etched according to the RIE process utilizing a chlorine type gas, the resist film 63 being used as a mask. Thus, the configuration of the amorphous silicon film 24 to become the active layer of the TFT 20 is defined, and a data bus line 14, a source electrode 30, a drain electrode 28 and a storage capacitor electrode 32 are formed. At this time, the region of the amorphous silicon film 24 to become the channel of the TFT 20 is protected by the channel protection film 25. The resist film 63 is thereafter removed.

Figure 38A:
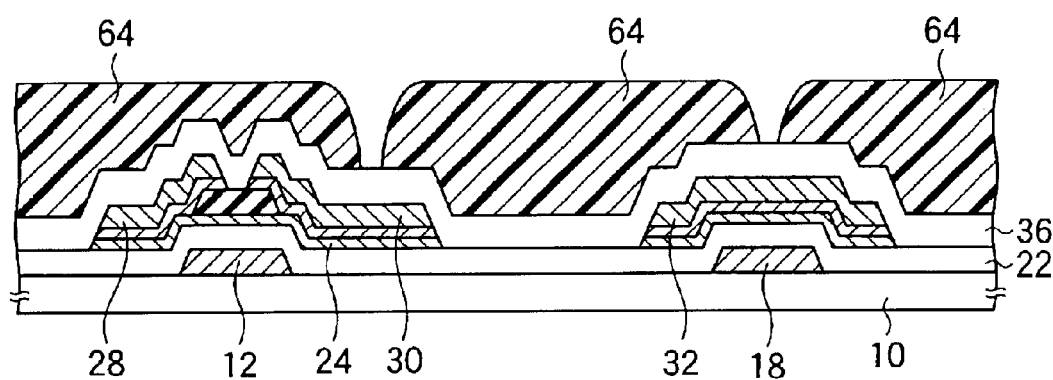
FIGS. 38A and 38B are (fourth) sectional views showing the method of manufacturing a liquid crystal display according to Embodiment 2-1 in the second mode for carrying out the invention.

Next, as shown in FIG. 38A, a final protective film 36 constituted by a transparent insulation film is formed on the entire surface of the top side of the glass substrate 10. The final protective film 36 is formed by depositing SiN to a thickness of 330 nm using a plasma CVD process, for example. A resist film 64 having openings to form contact holes is then formed on the final protective film 36.

Figure 38B:
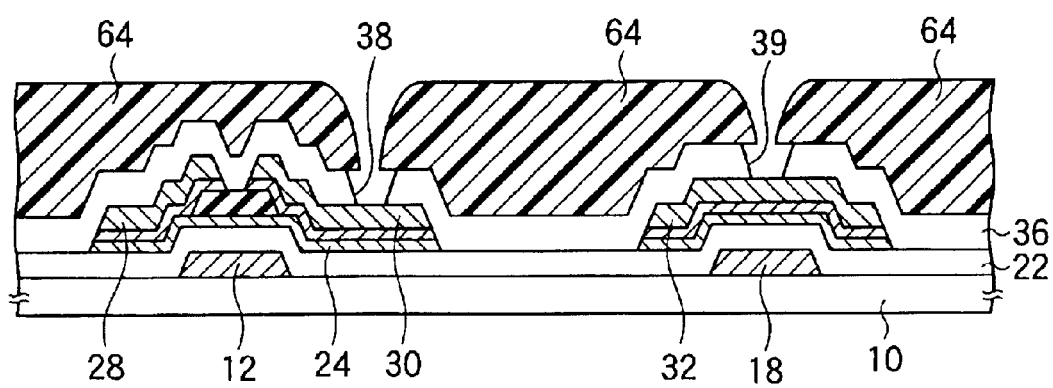

Next, as shown in FIG. 38B, the final protective film 36 is etched through an RIE process utilizing a fluorine (F) type gas using the resist film 64 as a mask to form contact holes 38 and 39 that extend to reach the source electrode 30 and the storage capacitor electrode 32, respectively. The resist film 64 is thereafter removed.

Figure 39A:
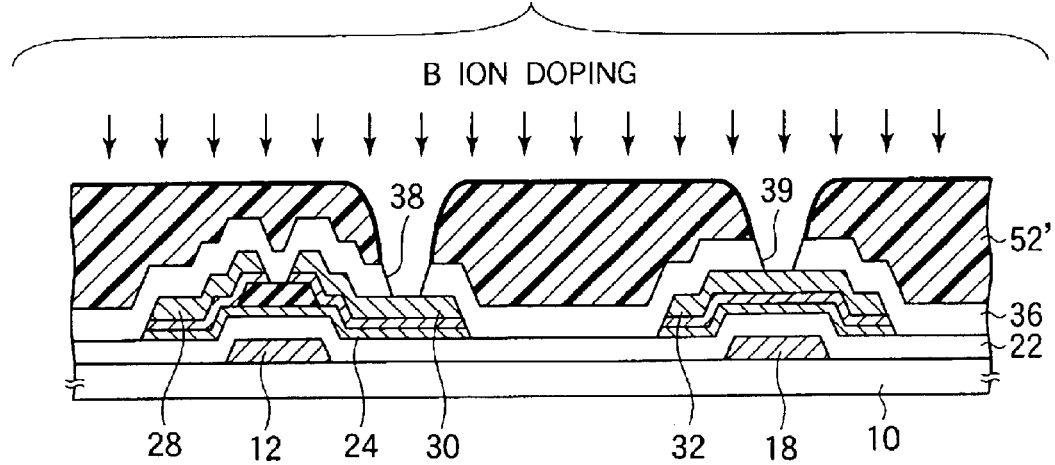
FIGS. 39A and 39B are (fifth) sectional views showing the method of manufacturing a liquid crystal display according to Embodiment 2-1 in the second mode for carrying out the invention.

Next, as shown in FIG. 39A, a positive photoresist is applied to the entire surface of the top side of the substrate 10 to a thickness of about 3.5 $\mu$m to form a resist film 52'. Thereafter, exposure and developing processes are performed on the resist film 52' to form openings where the contact holes 38 and 39 are to be exposed. Thus, the resist film 52' has a thickness of about 3 $\mu$m. The resist film 52' is thereafter subjected to post-baking at a temperature in the range from 130 to 165° C. For example, a preferable thickness of the resist film (the thickness of the same after the developing process) is in the range from 1 to 4 $\mu$m, although it depends on the type of the resist.

Next, a surface layer of the resist film 52' is doped with B (boron) ions using diborane ($B_2H_6$) gas diluted with $H_2$, to harden only the surface layer of the resist film 52'. When a compact reflective liquid crystal display to be used for a PDA is manufactured, for example, the flow rate, acceleration voltage and dose of the $B_2H_6$ gas are 35 sccm, 30 kV and $3\times10^{14}/cm^2$, respectively. While a preferable dose and acceleration voltage depend on the type of the photoresist film and the type of charged particles, the dose is in the range from $1 \times 10^{13}$ to $2 \times 10^{15}/cm^2$, and the acceleration voltage is in the range from 1 to 100 kV. In order to avoid unevenness of recesses and projections, the dose is preferably in the range from $5 \times 10^{13}$ to $1 \times 10^{5}/cm^2$, and the acceleration voltage is preferably in the range from 5 to 60 kV.

Preferably, the ions introduced into the resist film 52' are at least one kind of ions selected from a group consisting of H (hydrogen), He (helium), B, P (phosphorus), Ar (argon) and As (arsenic). To introduce P ions into the resist film 52', for example, phosphine ($PH_3$) gas diluted with $H_2$ is preferably used at a gas flow rate of 40 sccm and an acceleration voltage in the range from 5 to 60 kV and with a dose in the range from $5 \times 10^{13}$ to $1 \times 10^{15}/cm^2$.

Further, processes for introducing such ions into the resist film 52' include an RIE process, electron cyclotron resonance plasma process, inductively coupled plasma (ICP) process and TCP process in addition to the above-mentioned ion doping process.

Figure 39B:
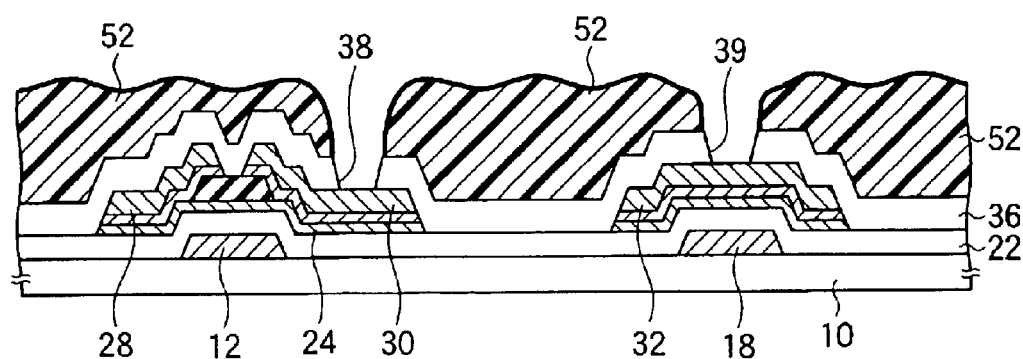

The resist film 52' is then thermally processed (baked) at a temperature in the range from 200 to 230° C. Then, since the layer (surface layer) hardened as a result of ion doping and an unhardened layer (a deep section) have different thermal deformation characteristics (thermal expansion coefficients or thermal absorption factors), fine wrinkle-like recesses and projections are formed on the surface of the resist film 52 as shown in FIG. 39B.

Next, a metal film made of Al is formed on the entire surface of the top side of the glass substrate 10 to a thickness of about 150 nm using a PVD process. Since the metal film is formed on the resist film 52 having recesses and projections on the surface thereof, fine recesses and projections are also formed on the surface of the metal film. The metal film is electrically connected to the source electrodes 30 and the storage capacitor electrodes 32 through contact holes 38 and 39, respectively.

Figure 40:
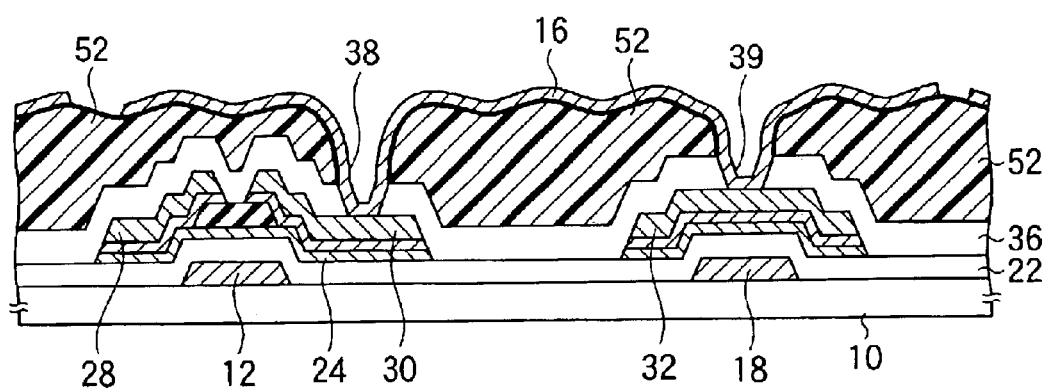
FIG. 40 is a (sixth) sectional view showing the method of manufacturing a liquid crystal display according to Embodiment 2-1 in the second mode for carrying out the invention.

Thereafter, a resist film for defining the configuration of pixel electrodes is formed on the metal film, and wet etching is performed on the metal film using a mixture of a phosphoric acid, a nitric acid and an acetic acid to form pixel electrodes 16 as shown in FIG. 40. Then, after removing the resist film, an alignment film 84 made of polyimide is formed on the entire surface of the top side of the substrate 10. This completes a TFT substrate 2.

A method of manufacturing a CF substrate 4 will now be described.

First, a Cr film is formed on a surface of a glass substrate 11 (a bottom surface in FIG. 34), and the Cr film is patterned using photolithography to form a black matrix 86. Thereafter, CF layers 88 in red, green and blue are formed on one surface of the glass substrate 11 using a red photosensitive resin, a green photosensitive resin and a blue photosensitive resin.

Next, an ITO (indium-tin oxide) is sputtered on to those CF layers 88 to form a transparent common electrode 90. An alignment film 85 made of polyimide is then formed on the common electrode 90. A CF substrate 4 is thus completed.

Next, spacers (not shown) are provided between the TFT substrate 2 and the CF substrate 4 to maintain a constant interval between them, and a liquid crystal 6 is sealed between the TFT substrate 2 and the CF substrate 4 using a vacuum injection process or dispenser process. A reflective liquid crystal display as shown in FIGS. 33 and 34 is thus completed.

In the present embodiment, since only the surface layer of the photoresist film 52' is hardened by applying B ions to the photoresist film 52' using an ion doping process, B ions can be applied throughout the resist film on the glass substrate with higher uniformity than that achievable with a method of hardening the surface layer of the photoresist film by irradiating it with UV light. This makes it possible to form the recesses and projections on the surface of the resist film 52 uniformly with high reproducibility.

In the present embodiment, since only the surface layer of the photoresist film 52' is hardened with B ions, a post-baking temperature as high as 165° C. can be used. This improves the controllability of the inclinations and pitches of the recesses and projections.

Further, since $N_2$ in the resist film 52' can be sufficiently removed by setting a high post-baking temperature, the occurrence of exposure bursting of the resist film 52' can be prevented when B ions are applied.

(Embodiment 2—2)

A method of manufacturing a reflective liquid crystal display according to Embodiment 2—2 in the present mode for carrying out the invention will now be described. In Embodiment 2—2, a resist film that has been used for forming contact holes in a final protective film is left in place, and recesses and projections are formed on the surface of the resist film.

When the contact holes 38 and 39 are formed in the final protective film 36 at the steps of Embodiment 2–1 shown in FIGS. 38A and 38B, in general, the contact holes 42 are formed also above the gate bus line terminals 40 (see FIGS. 2 and 3B) provided at ends of the gate bus lines 12 to expose the surface of the gate bus line terminals 40. The insulation film 22 must be removed through etching in addition to the final protective film 36 to form the contact holes 42. Therefore, over-etching occurs in the regions where the contact holes 38 and 39 are to be formed as shown in FIG. 38B, and the diameters of the contact holes 38 and 39 thus become greater than the diameters of the openings in the resist film 64. In case that the metal film to become the pixel electrodes is formed on the resist film 64, since the diameters of the contact holes 38 and 39 are greater than the diameters of the openings in the resist film 64, the metal film on the resist film 64 is not electrically connected to the source electrodes 30 and the storage capacitor electrodes 32. For this reason, in Embodiment 2–1, the resist film 64 used for forming the contact holes 38 and 39 is removed, and the resist film 52' is newly formed on the final protective film 36 to form recesses and projections on the surface of the resist film 52.

On the contrary, in the present embodiment, etching conditions are controlled to form contact holes having diameters smaller than the diameters of openings in a resist film.

Figure 41A:
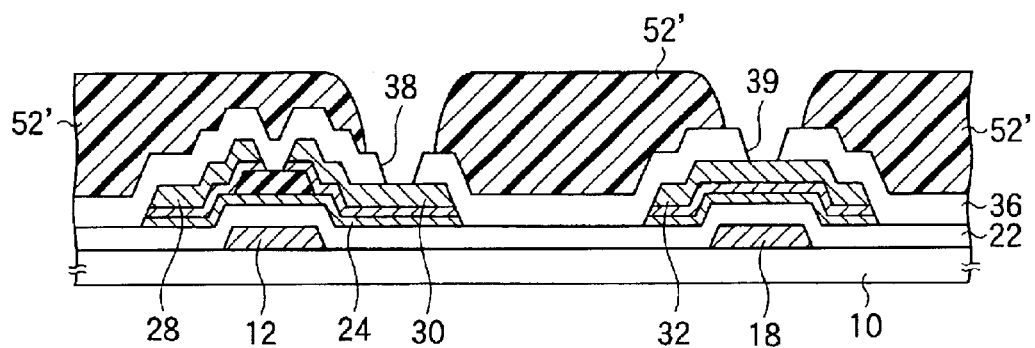
FIGS. 41A and 41B are (first) sectional views showing a method of manufacturing a liquid crystal display according to Embodiment 2—2 in the second mode for carrying out the invention.

Specifically, as shown in FIG. 41A, after forming a final protective film 36 made of SiN on a glass substrate 10 in the same way as that in Embodiment 2–1, a positive photoresist 52' is applied on to the final protective film 36. Exposure and developing processes are then performed to form openings for forming contact holes in the photoresist film 52'. Thereafter, the final protective film 36 is etched using an RIE process utilizing $SF_6/O_2$ gas, the resist film 52' serving as a mask.

At this time, the speed of etching of the final protective film 36 is low and the speed of etching of the resist film 52' is high when the flow rate of the $SF_6$ gas is low and the flow rate of the $O_2$ gas is high. Then, the diameters of contact holes 38 and 39 formed in the final protective film 36 are smaller than the diameters of the openings in the resist film 52'. For example, the $SF_6$ gas and the $O_2$ gas flow at flow rates of 130 sccm and 270 sccm respectively with a pressure of 8.0 Pa and power of 600 W.

The content of Si in SiN may be increased such that a film with a higher density will be formed to make the final protective film 36 harder, thereby making the final protective film 36 more resistant to etching. For example, an ordinary nitride film is formed using $SiH_4$ gas at a flow rate of 240 sccm, $N_2$ gas at a flow rate of 2100 sccm, a pressure of 213.3 Pa, a temperature of 230° C. and power of 2000 W. A denser and harder nitride film is formed using $SiH_4$ gas at a flow rate of 180 sccm, $NH_3$ gas at a flow rate of 600 sccm, $N_2$ gas at a flow rate of 4000 sccm, a pressure of 160 Pa, a temperature of 230° C. and power of 1400 W. For example, it may alternatively be formed using $SiH_4$ gas at a flow rate of 240 sccm, $NH_3$ gas at a flow rate of 600 sccm, $N_2$ gas at a flow rate of 4000 sccm, a pressure of 160 Pa, a temperature of 230° C. and power of 1400W. For example, a nitride film thus formed is etched using $SF_6$ gas at a flow rate of 130 sccm, $O_2$ gas at a flow rate of 270 sccm, a pressure of 8.0 Pa and power of 600 W.

Figure 41B:
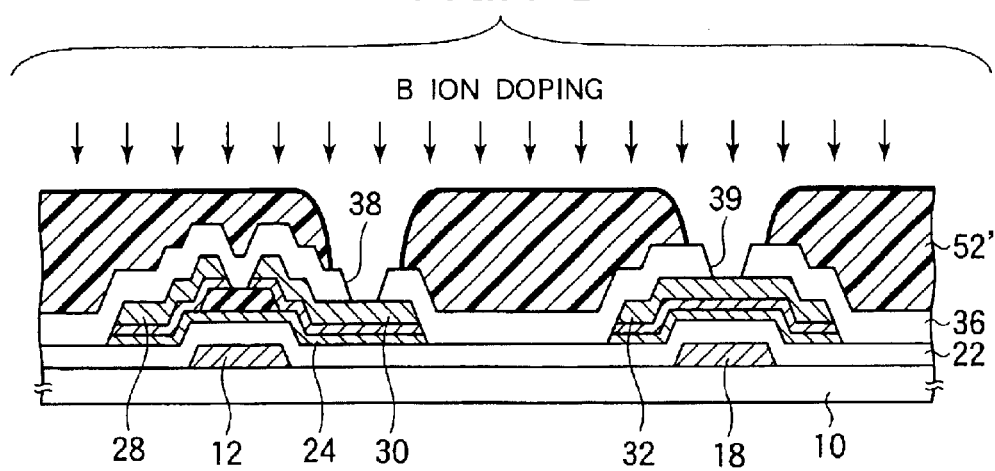

Next, as shown in FIG. 41B, the resist film 52' that has been used for forming the contact holes 38 and 39 is doped with B ions to harden only a surface layer of the resist film 52'.

Figure 42:
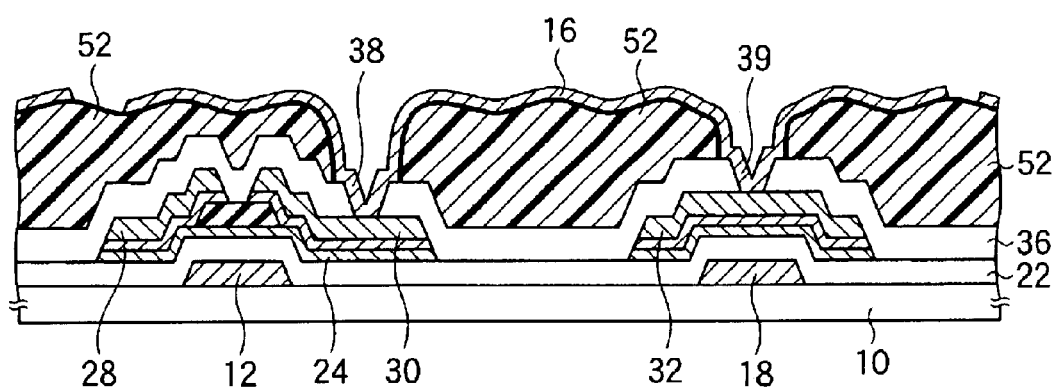
FIG. 42 is a (second) sectional view showing the method of manufacturing a liquid crystal display according to Embodiment 2—2 in the second mode for carrying out the invention.

The resist film 52' is then thermally processed (baked) at a temperature in the range from 200 to 230° C. As a result, fine recesses and projections are formed on the surface of the resist film 52 as shown in FIG. 42. Pixel electrodes 16 are thereafter formed on the resist film 52. As thus described, a reflective liquid crystal display having pixel electrodes 16 with wrinkle-like fine recesses and projections on a surface thereof is manufactured.

In the present embodiment, the resist film 52' that has been used for forming the contact holes 38 and 39 is doped with charged particles, and a thermal process is thereafter performed to form fine wrinkle-like recesses and projections on the surface of the resist film 52. This is advantageous in that the number of steps and manufacturing cost are smaller than those achievable in Embodiment 2–1.

(Other Embodiments)

While the resist film 52' is doped with charged particles using an ion doping process in Embodiment 2–1, the resist film 52' may be doped with charged particles using an RIE process. For example, after the resist film 52' is subjected to post-baking, a He plasma process may be performed on the resist film 52' at a pressure of 6.0 Pa, He gas flow rate of 300 sccm and power of 1000 W for a processing time of 30 seconds using an RIE process.

When the resist film 52' is doped with charged particles using an RIE process, it is necessary to use a gas that makes the final protective film 36 resistant to etching in regions thereof that are not covered by the resist film 52'. When the final protective film 36 is formed of SiN, it is preferable to dope the resist film 52' with He as described above. Gasses that can be used for doping the resist film 52' with charged particles using an RIE process include $CHF_3$ gas and HCl gas in addition to He gas. It is preferable to use $CHF_3$ gas when the final protective film 36 is made of a silicon nitride and to use HCl gas when the final protective film 36 is made of a silicon oxide.

While the use of channel-protected TFTs 20 as switching elements has been referred to in Embodiment 2–1, channel-etched TFTs may be used instead. Channel-etched TFTs are formed as described below.

Figure 43A:
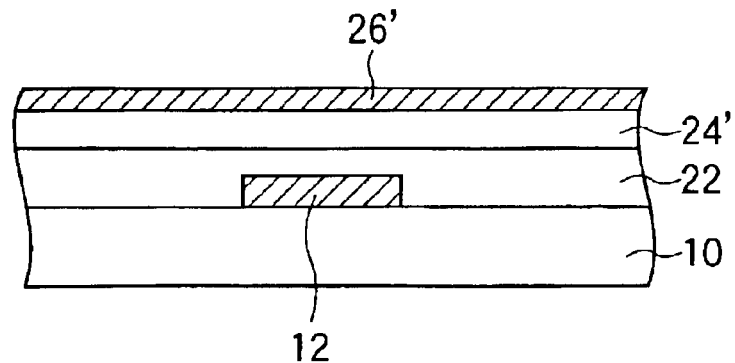
FIGS. 43A and 43C are sectional views showing a method of manufacturing a channel-etched TFT.

As shown in FIG. 43A, an amorphous silicon film 24' to become active layers is formed with a great thickness (e.g., a thickness of 120 nm) on a gate insulation film 22, and an n⁺-type amorphous silicon film 26' to become an ohmic contact layer is thereafter formed on the same.

Figure 43B:
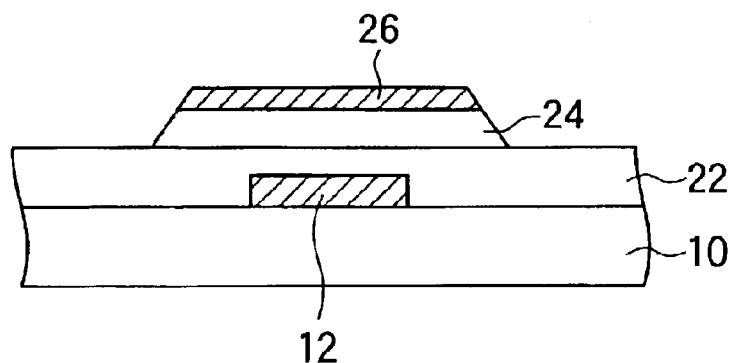

Next, as shown in FIG. 43B, the amorphous silicon film 24 and the n⁺-type amorphous silicon film 26 are patterned in the form of islands using photolithography.

Figure 43C:
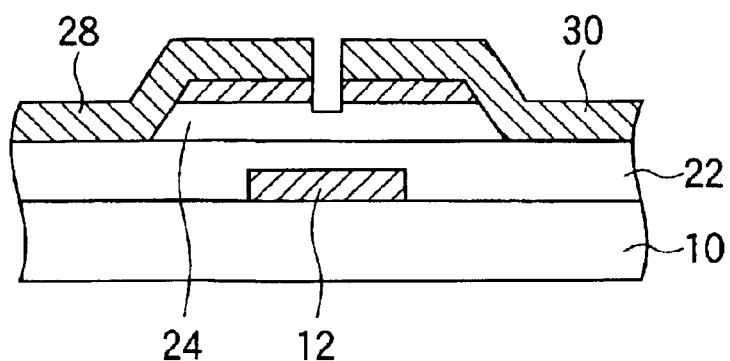

Next, as shown in FIG. 43C, a metal film is formed on the entire surface of the top side of the glass substrate 10, and the metal film is patterned using photolithography to form source electrodes 30 and drain electrodes 28. At this time, the etching is performed halfway in the direction of the thickness of the amorphous silicon film 24 to electrically isolate the source electrodes 30 and the drain electrodes 28. This completes channel-etched TFTs.

Figure 44:
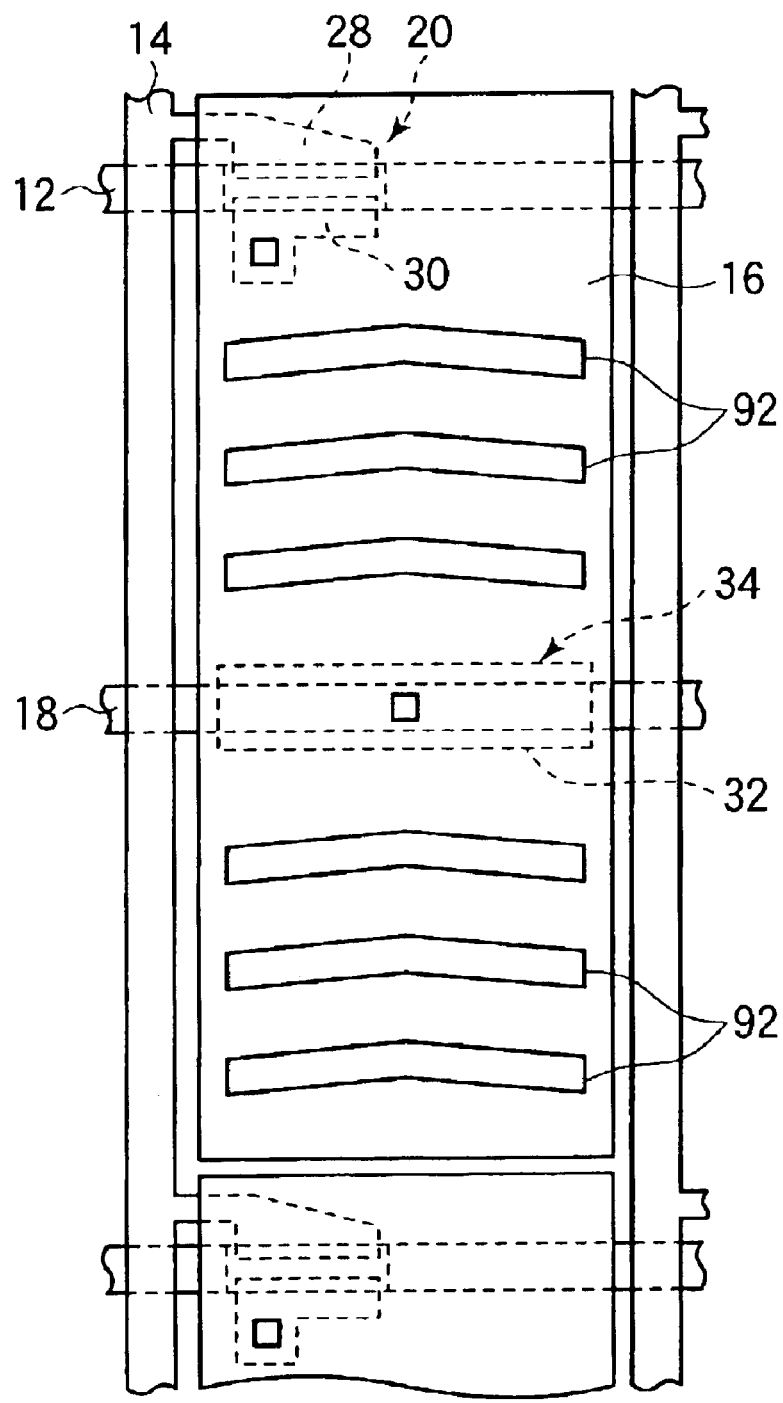
FIG. 44 is a plan view showing an example in which patterns are provided on pixel electrodes 134 to regulate the extending direction of wrinkle-like recesses and projections.
Figure 48A:
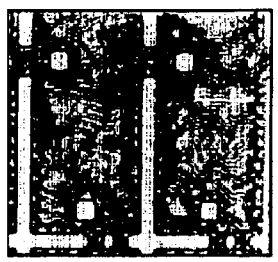
FIGS. 48A to 48H are optical microscopic images showing examples of wrinkle-like recesses and projections formed on a surface of a resist film.
Figure 48B:
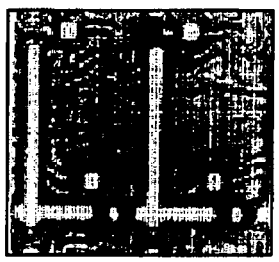
Figure 48C:
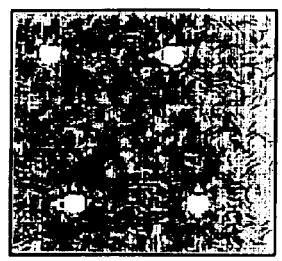
Figure 48D:
Figure 48E:
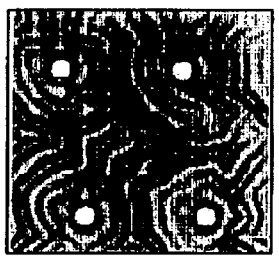
Figure 48F:
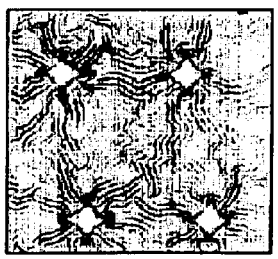
Figure 48G:
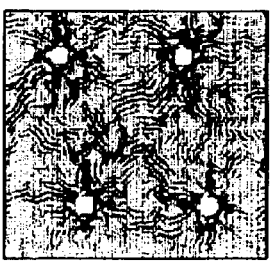
Figure 48H:
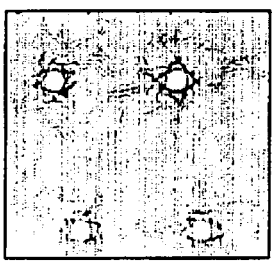
Figure 49:
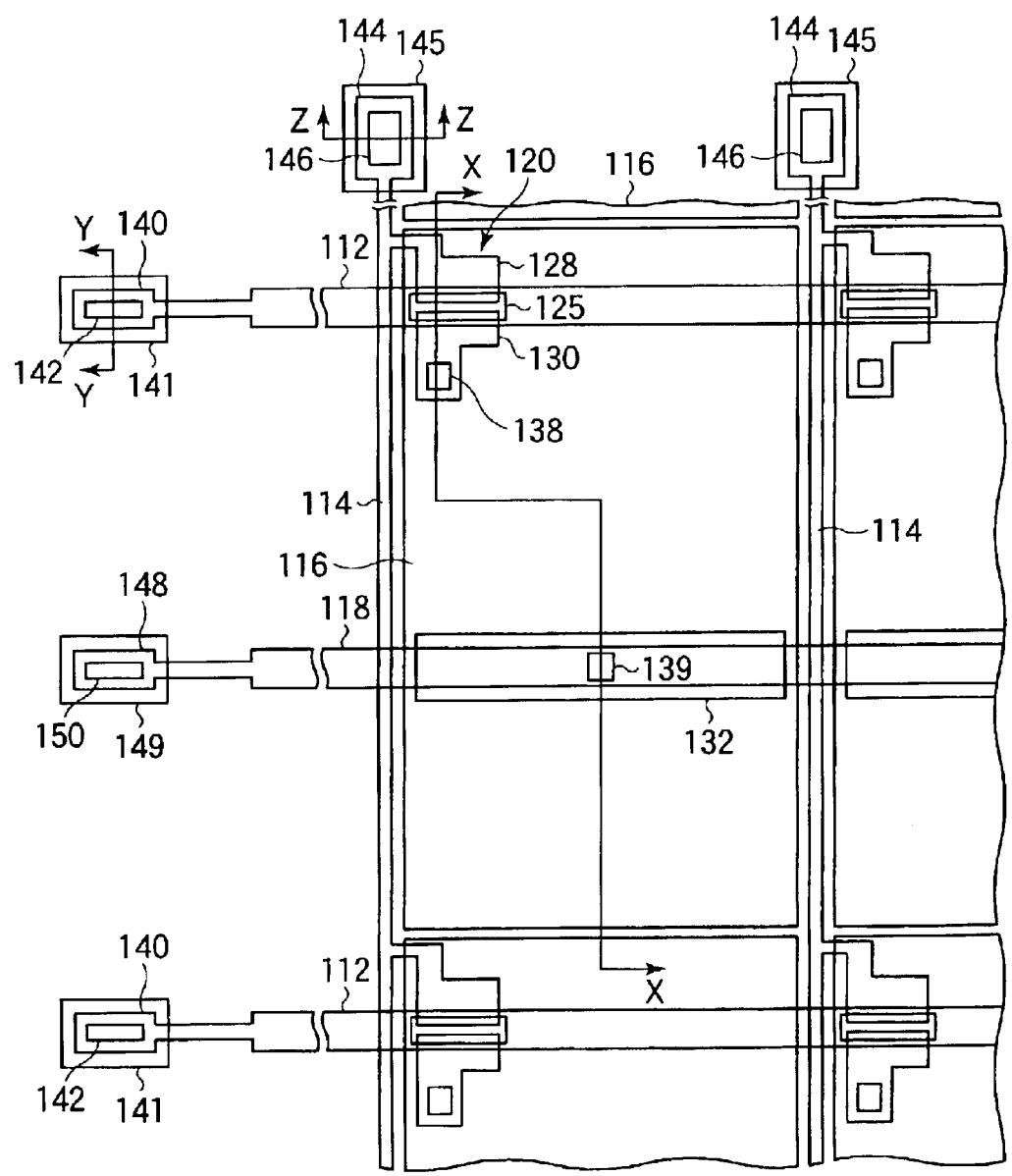
FIG. 49 shows a configuration of a substrate for a liquid crystal display according to the related art.
Figure 50A:
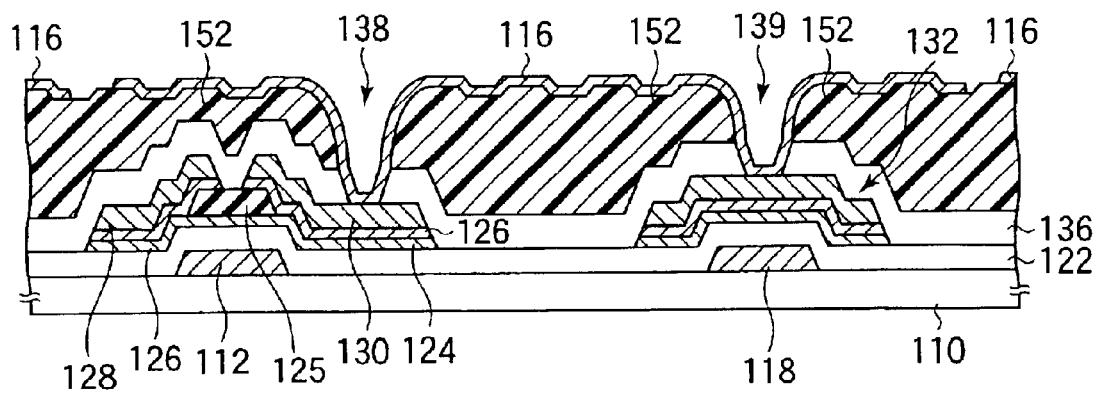
FIGS. 50A to 50C are sectional views showing the configuration of the substrate for a liquid crystal display according to the related art.
Figure 50B:
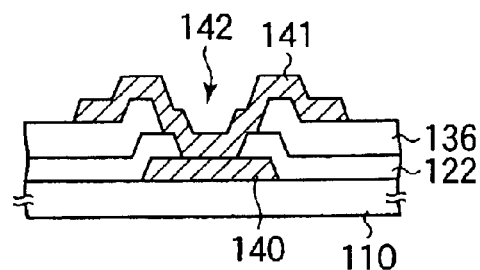
Figure 50C:
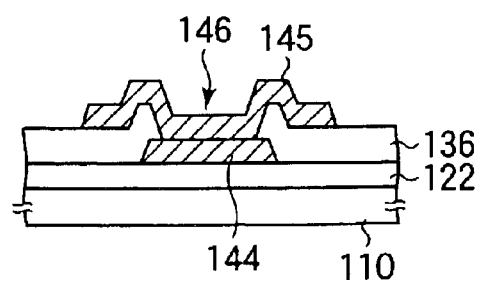
Figure 51:
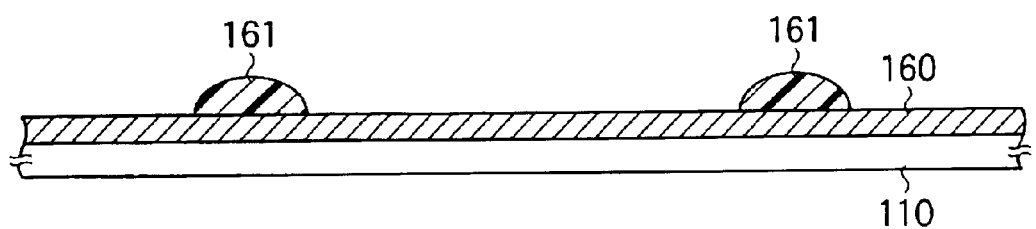
FIG. 51 is a sectional view taken in a process showing a method of manufacturing a substrate for a liquid crystal display according to the related art.
Figure 52:
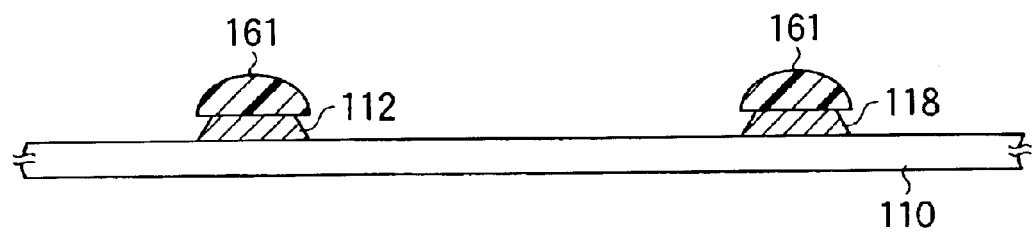
FIG. 52 is a sectional view taken in a process showing the method of manufacturing a substrate for a liquid crystal display according to the related art.
Figure 53:
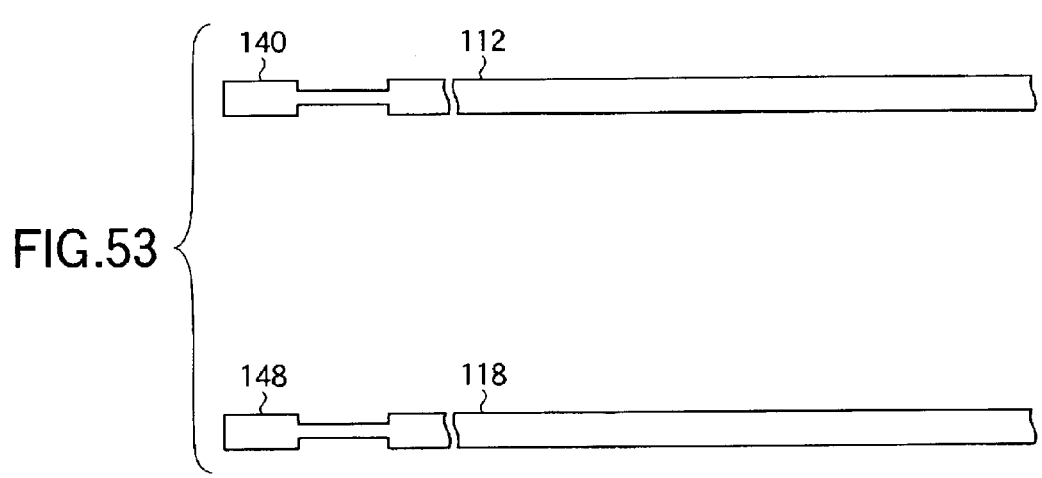
FIG. 53 shows the method of manufacturing a substrate for a liquid crystal display according to the related art.
Figure 54:
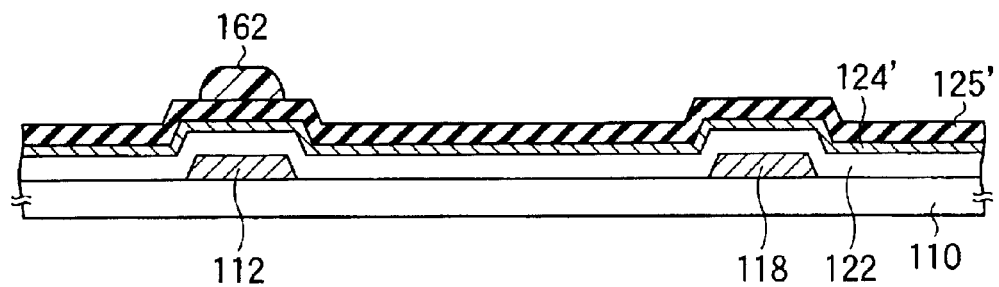
FIG. 54 is a sectional view taken in a process showing the method of manufacturing a substrate for a liquid crystal display according to the related art.
Figure 55:
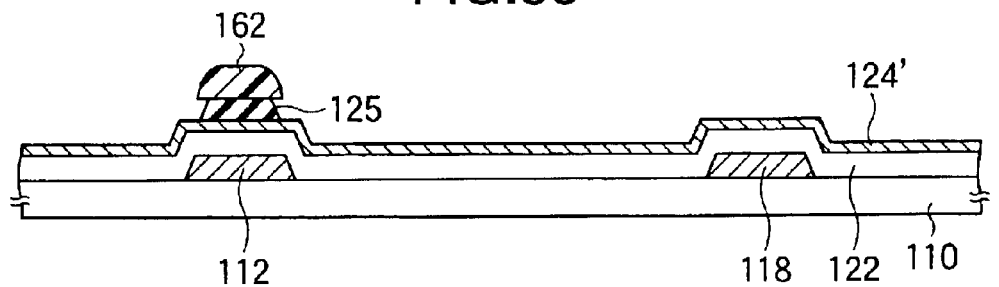
FIG. 55 is a sectional view taken in a process showing the method of manufacturing a substrate for a liquid crystal display according to the related art.
Figure 56:
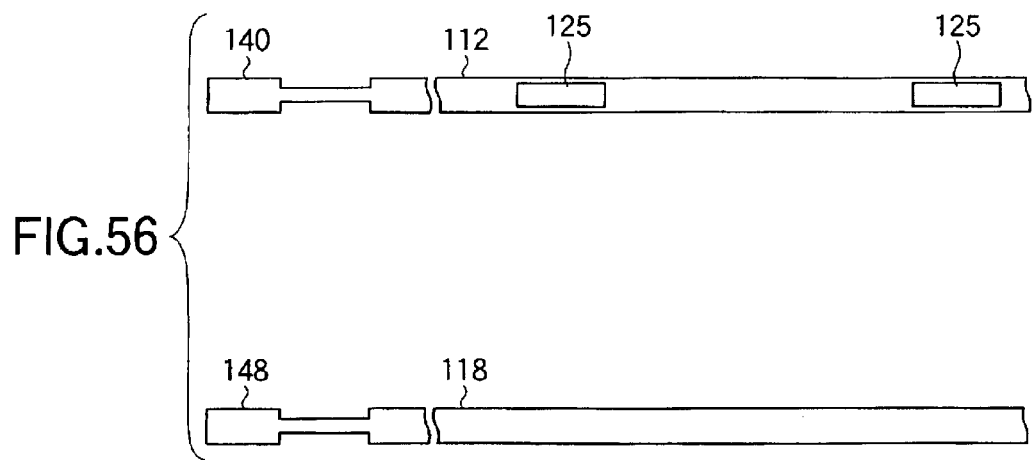
FIG. 56 shows the method of manufacturing a substrate for a liquid crystal display according to the related art.
Figure 57:
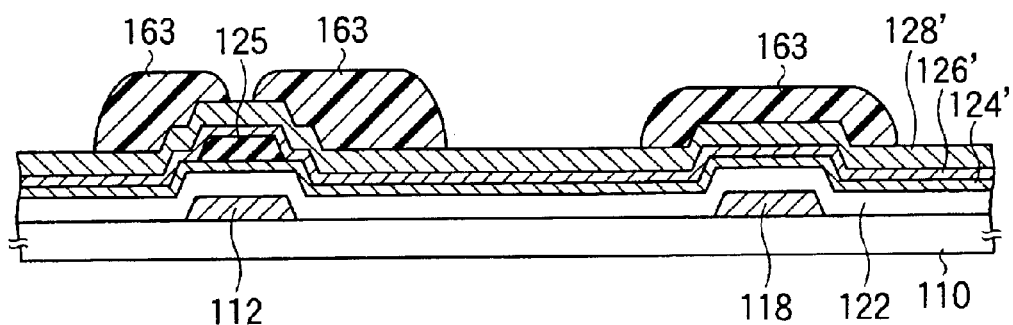
FIG. 57 is a sectional view taken in a process showing the method of manufacturing a substrate for a liquid crystal display according to the related art.
Figure 58:
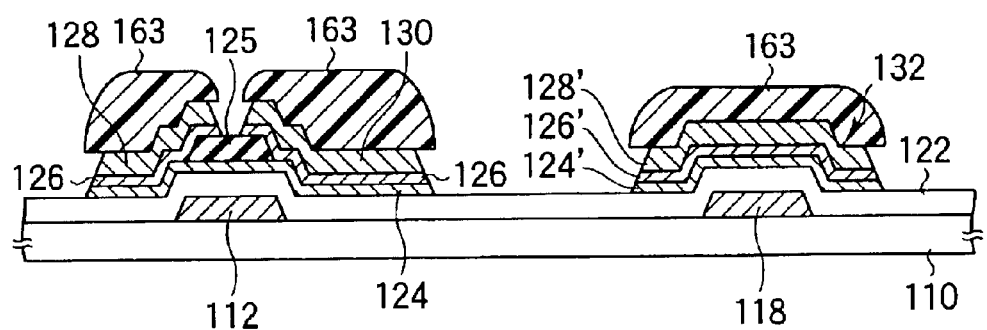
FIG. 58 is a sectional view taken in a process showing the method of manufacturing a substrate for a liquid crystal display according to the related art.
Figure 59:
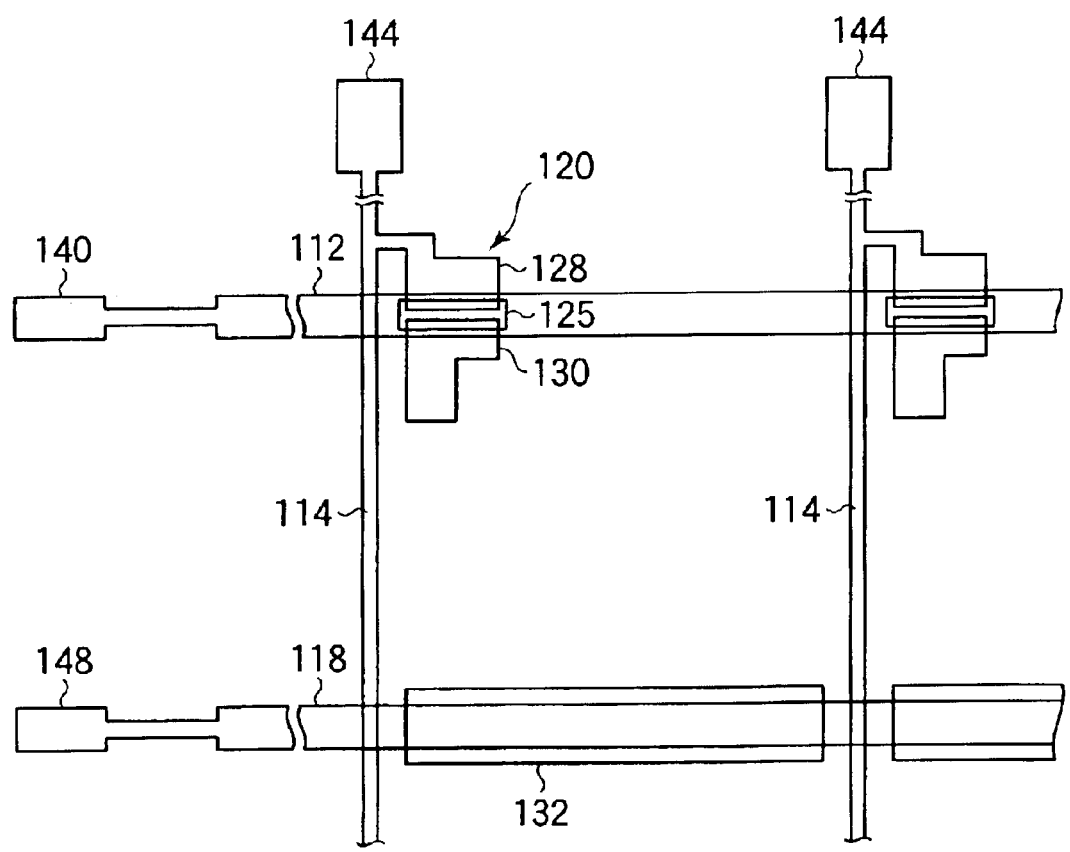
FIG. 59 shows the method of manufacturing a substrate for a liquid crystal display according to the related art.
Figure 60:
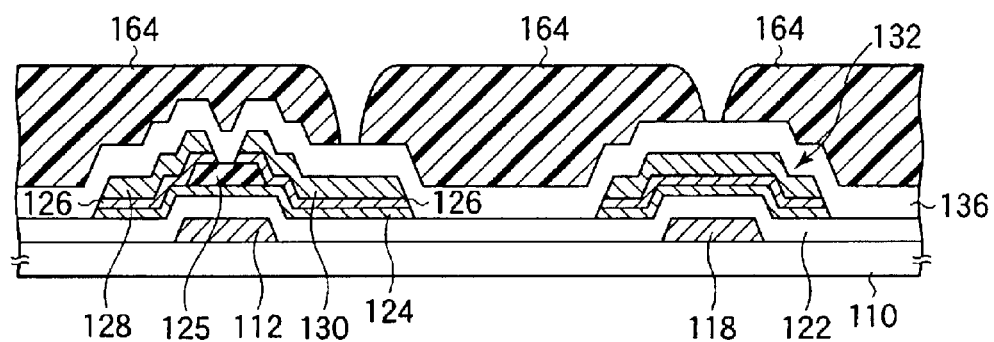
FIG. 60 is a sectional view taken in a process showing the method of manufacturing a substrate for a liquid crystal display according to the related art.
Figure 61A:
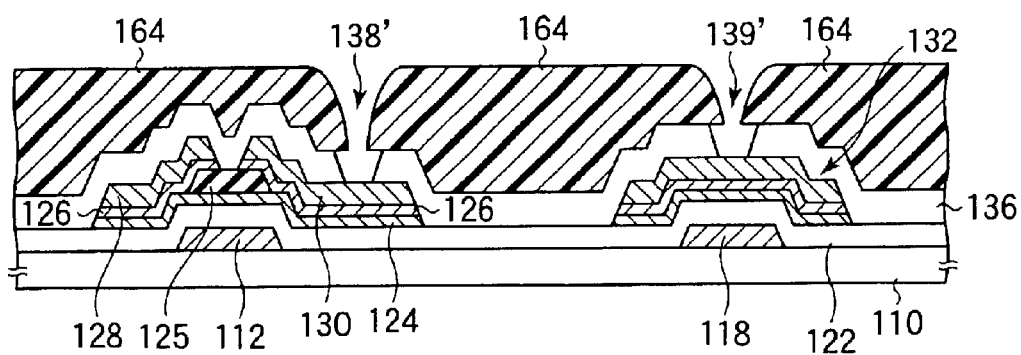
FIGS. 61A to 61C are sectional views taken in a process showing the method of manufacturing a substrate for a liquid crystal display according to the related art.
Figure 61B:
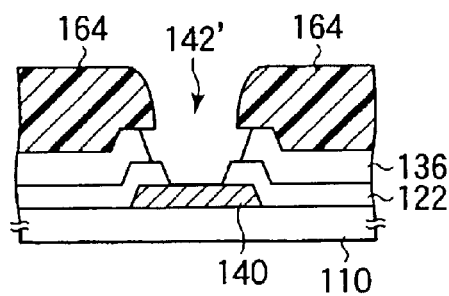
Figure 61C:
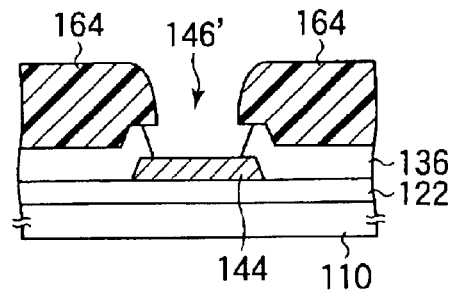
Figure 62:
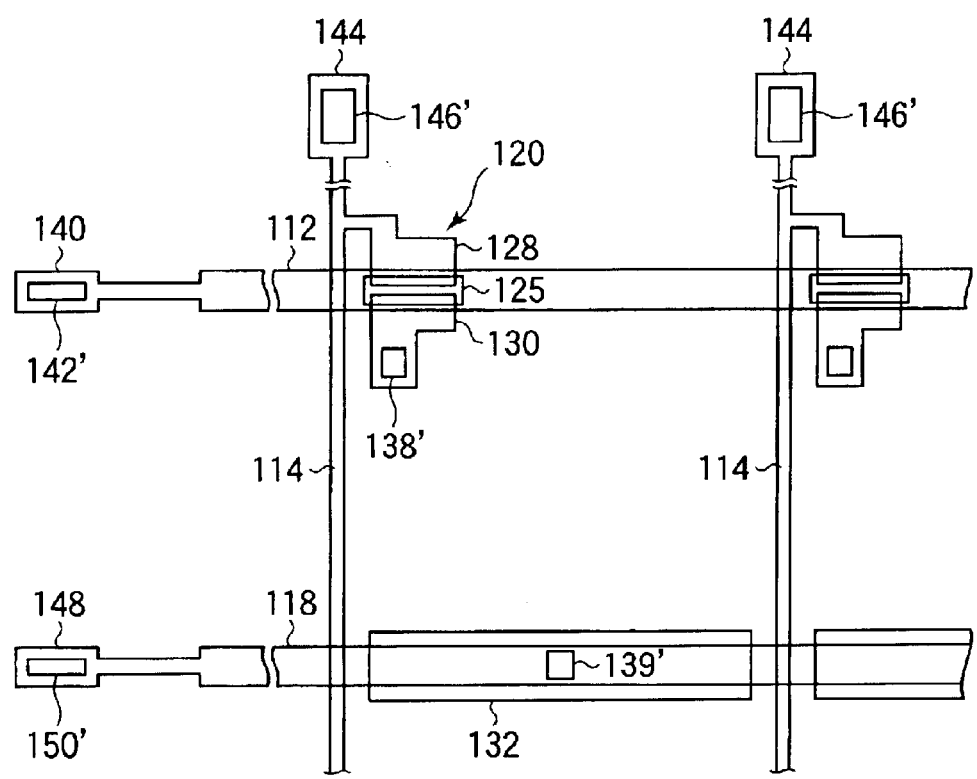
FIG. 62 shows the method of manufacturing a substrate for a liquid crystal display according to the related art.
Figure 63:
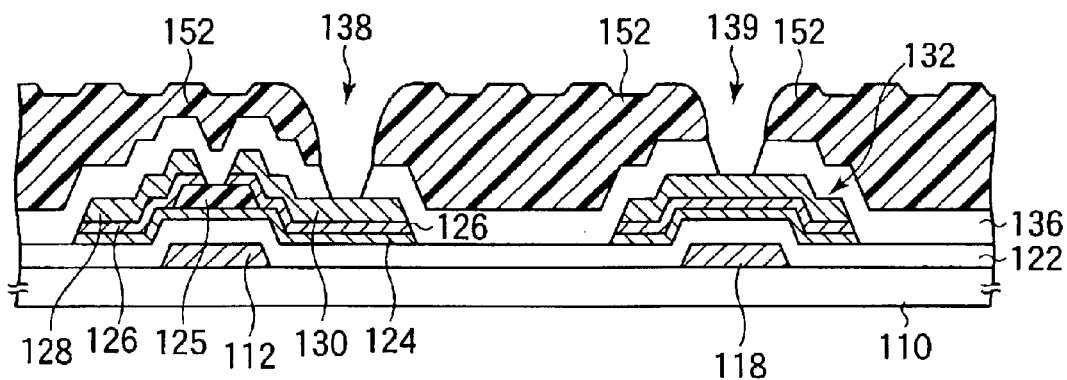
FIG. 63 is a sectional view taken in a process showing the method of manufacturing a substrate for a liquid crystal display according to the related art.
Figure 64:
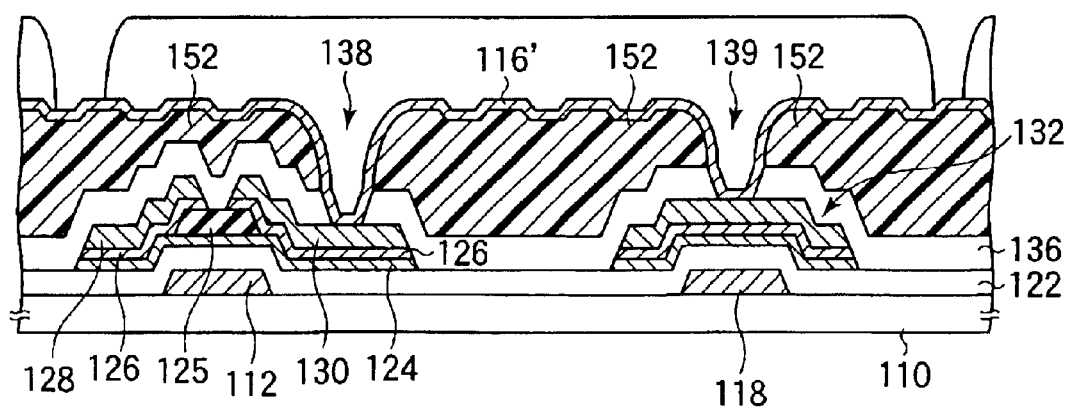
FIG. 64 is a sectional view taken in a process showing the method of manufacturing a substrate for a liquid crystal display according to the related art.

Further, pixel electrodes 16 may be provided with patterns 92 that are slightly bent in the middle thereof and that extend in the horizontal direction as shown in FIG. 44. For example, when the metal film 60 is etched at the steps shown in FIGS. 35A and 35B to form the gate bus lines 12 and the storage capacitor bus lines 18, there is provided metal patterns that are slightly bent in the middle thereof and that extend in the horizontal direction. As a result, the resist film 52' is also formed with similar patterns (projections) that follow the metal patterns.

When the resist film 52' is thermally processed, the wrinkle-like recesses and projections on the surface of the resist film 52 are guided by the patterns to extend in the same direction as that of the patterns. On the surface of the pixel electrodes 16 on the resist film 52, recesses and projections are formed which follow the recesses and projections including the patterns 92 on the surface of the resist film 52. As a result, light is selectively reflected in a desired direction. In the case of a small-sized apparatus such as a PDA, since the liquid crystal display and the light of sight of a user define a substantially constant angle, it is preferable to align reflected light in one direction. The present embodiment can be used in such an occasion.

(Ion Doping Conditions and Baking Conditions)

A description will now be made on results of a study to find optimum ion doping conditions and baking conditions.

The inventors first applied a positive first novolac photoresist (hereinafter referred to as "resist A") throughout a top surface of a glass substrate to a thickness of 1.3 μm and exposed and developed the same in a predetermined pattern, and post-baking was performed at 150° C. with a hot plate. Thereafter, a surface layer of the resist film was doped with B ions using $B_2H_6$ gas at an acceleration voltage of 30 kV with a dose of $3 \times 10^{15}/cm^2$ for a doping time of 216 seconds. The resist film was then thermally baked at 220° C. that is a setting temperature of the resist. As a result, wrinkle-like recesses and projections were formed in a part of the surface of the resist film. FIGS. 47A and 47B respectively show an image of the surface of the resist film taken with an optical microscope at this time and an image of a section of the resist film taken with an electronic microscope.

Under the above-described conditions, many regions on the resist film surface had no recess and projection formed therein, and many exposure bursts and cracks occurred. The inventors judged that the dose of the charged particles was too great from the fact that many exposure bursts and cracks occurred.

Then, a similar experiment was conducted with the acceleration voltage decreased to 10 kV and the dose reduced to $1 \times 10^{14}/cm^2$. As a result, recesses and projections could be formed throughout the resist film on the substrate without unevenness.

Thereafter, similar experiments were conducted with the gas species, the acceleration voltage, the dose and the doping time varied. Further, similar experiments were conducted with the photoresist changed to a positive second novolac photoresist (hereinafter referred to as "resist B"). Taking differences between the characteristics of the resist films into consideration, a film thickness of 1.3 μm and a film thickness of 3.0 μm were adopted for the resist A and the resist B, respectively. The pitches and depths of wrinkle-like recesses and projections thus generated were checked. The results are summarized in FIGS. 45 and 46.

Referring to samples with sample numbers 2, 3, 6, 7, 8 and 9, metal films were formed on resist films to provide reflective electrodes whose reflectivity was measured. FIG. 46 also shows the results. FIGS. 48A to 48H show photographic images of samples with sample numbers 2, 3, 6, 7, 8, 10, 11 and 12 taken with an optical microscope.

In FIG. 45, HP represents baking performed using a hot plate that accompanies a developing apparatus, and CO represents baking performed using a clean oven (manufactured by TABAI ESPEC CORP.). Further, reflectivities were obtained by radiating parallel rays at an angle of 30° to the normal of reflective electrodes and measuring the luminance of the same. The reflectivities are shown as relative values on an assumption that light incident upon a normal white plate having no recess and projection under the same condition is reflected in the normal direction with intensity of 100%. Furthermore, the low dose mode is a mode in which a dose is reduced by a stop at the electrodes.

As shown in FIGS. 45 and 46, no recesses and projection was formed on a resist film at all when the acceleration voltage was 10 kV and the dose was $3\times10^{13}/cm^2$ in the low dose mode. No recess and projection was formed on a resist film at all when the baking temperature was 170° C.

It was observed that recesses and projections could be formed on a resist film with high reproducibility and without unevenness when the acceleration voltage was in the range from 5 kV to 60 kV and the dose was in the range from $5\times10^{13}$ to $1\times10^{15}/cm^2$. It was also observed that recesses and projections could be formed on a resist film with high reproducibility and without unevenness when the resist film was doped with P ions using $PH_3$ gas.

The sample No. 8 at an acceleration voltage of 60 kV exhibits the highest reflectivity to parallel rays at an incident angle of 30°. Wrinkle-like recesses and projections on the sample No. 8 had coarse pitches and had a reflectivity as high as 95.8%.

While unevenness attributable to marks of pins and grooves on a hot plate was visually observed on the samples No. 1 to 9 that were post-baked using a hot plate of a developing apparatus, no unevenness was observed at all on the samples No. 10 to 13 that were post-baked at a variable temperature in a clean oven.

Further, it was observed that wrinkles on the samples No. 10 to 13 post-baked at a variable temperature in a clean oven could be controlled such that they became shallow at high temperatures.

Inclinations and pitches of recesses and projections can be greatly varied by controlling conditions for irradiation with charged particles and the baking temperature. Therefore, the present mode for carrying out the invention makes it possible to manufacture reflective electrodes including those having a near mirror surface with a low degree of scattering suitable for small-sized liquid crystal displays of 2 to 5 inches, for example, and those having a high degree of scattering suitable for medium-sized liquid crystal displays of 6 to 15 inches with high uniformity and reproducibility. This is advantageous in that display characteristics of a reflective liquid crystal display are improved.

The present mode for carrying out the invention can be applied to transflective liquid crystal displays in which openings are provided in a part of reflective electrodes to display an image by transmitting light from a backlight to the liquid crystal panel in a dark place.

As described above, in the present mode for carrying out the invention, only a surface layer of an organic resin film is hardened by applying charged particles to the same; a thermal process is thereafter performed to form wrinkle-like recesses and projections on the surface of the organic resin film; and reflective electrodes are formed on the same. It is therefore possible to control inclinations and pitches of recesses and projections. This is advantageous in that display characteristics of a reflective liquid crystal display are improved.

The invention is not limited to the above-described modes for carrying out the same and may be modified in various ways.

For example, while the wrinkled resin layer 52 is formed from a positive resist in the first mode for carrying out the invention, the invention is not limited to the same, and the wrinkled resin layer 52 may be formed from a negative resist.

While the wrinkled resin layer 52 in the first mode for carrying out the invention is formed by baking the resist pattern 64 after irradiating the surface of the resist pattern 64 made of a photosensitive resin with UV light, this is not limiting the invention. The resist pattern 64 may be formed from a resin that is appropriately selected, and the resist pattern 64 may be subjected to other processes to form the wrinkled resin layer 52 on the same.

As described above, the invention makes it possible to provide a liquid crystal display having good display characteristics with reduced manufacturing steps.

What is claimed is:

1. A method of manufacturing a reflective liquid crystal display comprising:
   forming an organic resin film by applying an organic resin on to a substrate;
   baking the organic resin film;
   hardening only a surface layer of the organic resin film by applying charged particles to the same;
   forming wrinkle-like recesses and projections on a surface of the organic resin film by performing a thermal process on the same; and
   forming a reflective electrode on the organic resin film.

2. A method of manufacturing a reflective liquid crystal display according to claim 1, wherein a positive photoresist is used as the organic resin.

3. A method of manufacturing a reflective liquid crystal display according to claim 1, wherein the baking step is performed at a temperature in the range from 130 to 165° C. at the baking step.

4. A method of manufacturing a reflective liquid crystal display according to claim 1, wherein the thermal process is performed at a temperature in the range from 200 to 230° C.

5. A method of manufacturing a reflective liquid crystal display according to claim 1, wherein at least one kind of ions selected from among a group comprising H, He, B, P, Ar and As is applied to the organic resin film at the step of applying charged particles.

6. A method of manufacturing a reflective liquid crystal display according to claim 1, wherein the charged particles are accelerated at an acceleration voltage in the range from 1 kV to 100 kV at the step of applying charged particles.

7. A method of manufacturing a reflective liquid crystal display according to claim 1, wherein the dose of the charged particles is in the range from $1\times10^{13}$ to $2\times10^{15}/cm2$ at the step of applying charged particles.

8. A method of manufacturing a reflective liquid crystal display according to claim 1, wherein the charged particles are applied to the organic resin film using any of an ion doping process, a reactive ion plasma etching process, an electron cyclotron resonance plasma process, an ICP process, and a TCP process.

9. A method of manufacturing a reflective liquid crystal display, comprising the steps of:

forming a gate bus line to which a scan signal is supplied, a data bus line to which a display signal is supplied, and a thin film transistor whose gate electrode is connected to the gate bus line and whose drain electrode is connected to the data bus line on a first substrate;

forming an insulation film above the gate bus line, the data bus line, and the thin film transistor;

forming a first photoresist film on the insulation film;

performing first exposure and developing to form an opening in a position of the first photoresist film associated with a source electrode of the thin film transistor;

etching the insulation film using the first photoresist film as a mask to form a contact hole that leads to the source electrode of the thin film transistor;

removing the first photoresist film;

forming a second photoresist film on the insulation film;

performing second exposure and developing to form an opening in a position of the second photoresist film associated with the contact hole;

doping a surface layer of the second photoresist film with charged particles;

forming wrinkle-like recesses and projections on a surface of the second photoresist film by performing a thermal process on the same;

forming a conductive reflective film throughout a top entire surface of the second photoresist film;

forming a first electrode by patterning the reflective film;

arranging a second substrate having a second electrode comprising a conductor film provided thereon and the first substrate opposite to each other; and sealing a liquid crystal between the first and second substrates.

10. A method of manufacturing a reflective liquid crystal display, comprising the steps of:

forming a gate bus line to which a scan signal is supplied, a data bus line to which a display signal is supplied, and a thin film transistor whose gate electrode is connected to the gate bus line and whose drain electrode is connected to the data bus line on a first substrate;

forming an insulation film above the gate bus line, the data bus line, and the thin film transistor;

forming a photoresist film on the insulation film;

performing exposure and developing to form an opening in a position of the photoresist film associated with a source electrode of the thin film transistor;

forming a contact hole that leads to the source electrode of the thin film transistor by etching the insulation film using the photoresist film as a mask;

doping a surface layer of the photoresist film with charged particles;

forming wrinkle-like recesses and projections on a surface of the photoresist film by performing a thermal process on the same;

forming a conductive reflective film throughout a top entire surface of the photoresist film;

forming a first electrode by patterning the reflective film;

arranging a second substrate having a second electrode comprising a conductor film provided thereon and the first substrate opposite to each other; and sealing a liquid crystal between the first and second substrates.

* * * * *